United States Patent
Kurosawa et al.

(10) Patent No.: US 7,076,207 B2
(45) Date of Patent: Jul. 11, 2006

(54) COMMUNICATION APPARATUS AND CONTROL METHOD THEREFOR, INFORMATION APPARATUS AND CONTROL METHOD THEREFOR, COMMUNICATION SYSTEM, AND CONTROL PROGRAMS

(75) Inventors: Takahiro Kurosawa, Tokyo (JP); Yuichi Bannai, Tokyo (JP)

(73) Assignee: Canon Kabushiki Kaisha (JP)

(*) Notice: Subject to any disclaimer, the term of this patent is extended or adjusted under 35 U.S.C. 154(b) by 552 days.

(21) Appl. No.: 10/254,452

(22) Filed: Sep. 25, 2002

(65) Prior Publication Data
US 2003/0078038 A1 Apr. 24, 2003

(30) Foreign Application Priority Data
Sep. 28, 2001 (JP) .............................. 2001-301048

(51) Int. Cl.
*H04B 7/00* (2006.01)
(52) U.S. Cl. .................. 455/41.2; 455/413; 455/550.1; 455/556.1; 455/67.7
(58) Field of Classification Search ................ 455/41.1, 455/41.2, 41.3, 550.1, 556.1, 67.7
See application file for complete search history.

(56) References Cited

U.S. PATENT DOCUMENTS

| | | | |
|---|---|---|---|
| 2001/0055951 A1* | 12/2001 | Slotznick | 455/41 |
| 2002/0002707 A1* | 1/2002 | Ekel et al. | 725/87 |
| 2002/0068600 A1* | 6/2002 | Chihara et al. | 455/550 |
| 2002/0080090 A1* | 6/2002 | Borgstrom et al. | 345/1.1 |
| 2004/0162060 A1* | 8/2004 | Hara et al. | 455/414.1 |

* cited by examiner

*Primary Examiner*—Matthew Anderson
*Assistant Examiner*—Sanh Phu
(74) *Attorney, Agent, or Firm*—Rossi, Kimms & McDowell, LLP

(57) ABSTRACT

There is provided a communication apparatus which makes it possible to properly process data acquired by an external device even if the data is difficult to process by the external device that acquired the data. Information is acquired from an external apparatus by communication. It is determined whether the acquired information is suitable for processing by the communication apparatus. Processing of information determined to be unsuitable for processing by the communication apparatus is delegated to an information apparatus.

29 Claims, 19 Drawing Sheets

| [extension] | [delegate target (BD_ADDR/port)] |
|---|---|
| .jpg.gif.tiff.bmp | 04:89:11:22:33:60/808 |
| .mp2.mp3.m3u | 04:89:11:22:33:65/1872 |
| .csv | 04:89:11:22:33:66/70 |
| .pst | 04:89:11:22:33:66/71 |
| .swf | 04:89:11:22:33:67/2023 |
| .pdf.ps | 04:89:11:22:33:67/2024 |
| .doc.ppt.xls | 04:89:11:22:33:67/2030 |
| .(*) | 04:89:11:22:33:67/2000 |

FIG. 20

| [INPUT KEY INFORMATION] | [PROCESSING CONTENTS] |
|---|---|
| 0 | END REMOTE INPUT |
| 1 | SCROLL UP PAGES |
| 2 | SCROLL DOWN PAGES |
| 3 | MOVE TO NEXT ANCHOR/HOT SPOT |
| 4 | MOVE TO PREVIOUS ANCHOR/HOT SPOT |
| 5 | SELECT ANCHOR/HOT SPOT |

COMMUNICATION APPARATUS AND CONTROL METHOD THEREFOR, INFORMATION APPARATUS AND CONTROL METHOD THEREFOR, COMMUNICATION SYSTEM, AND CONTROL PROGRAMS

BACKGROUND OF THE INVENTION

1. Field of the Invention

The present invention relates to a communication apparatus and a control method therefor, an information apparatus and a control method therefor, a communication system, and control programs for implementing the methods, and more particularly relates to a technology of processing information acquired through communication by a communication apparatus.

2. Description of the Related Art

Conventionally, portable information terminals (Personal Digital Assistant: PDA) have been developed as information apparatuses for assisting individual intelligence activities. A portable information terminal of this kind has a liquid crystal image display device mounted thereon and has a schedule book function, a memory book function, a telephone book function, and the like.

Among communication apparatuses, development of portable telephone terminals has been progressed, and a function of accessing Web (World Wide Web) pages is provided for recent portable telephone terminals. Conventional peripheral technologies related to portable telephone terminals like these portable information terminals and portable telephone terminals will be described below.

Optical Devices

Development of optical design and production technology has realized magnifying projection using a prism with a free curved surface, and optical devices that provide a large screen even with a small size. Further, by combining such optical devices with high-definition display devices such as microdisplays, small-sized displays with a wide view and high resolution have been made available. This kind of technology has been so far applied to HMDs (Head Mounted Displays) and so on.

High-resolution Display Devices

Development of liquid crystal display technology has realized small-sized and high-resolution displays. Particularly in LCoS (Liquid Crystal on Silicon) technology which mounts a liquid crystal material onto a CMOS back plane, a technology of forming high-density circuits in semiconductor manufacturing is applied to realize high resolution and high response speed.

Input Devices Using a Pressure Sensitive Element or the Like

Input devices using a pressure sensitive element or the like to detect a slight movement of a finger and realize pointing on a two dimensional plane, equivalent to a pointing device (mouse), and button clicking have been diffused.

These input devices are used as an embedded type of pointing button or an auxiliary button for scrolling with a mouse of a note-type PC (Personal Computer).

Miniaturized Computer Devices

Progress in semiconductor manufacturing technologies, semiconductor design technologies, and others have realized small-sized and energy saving computer devices having high performance and high throughput. Also, processors composed of a chip provided functions such as bus control, memory control, timer, etc. implemented by such computer devices have come to be widely distributed.

In addition, the appearance of SoC (System on a Chip) technology and the like has allowed a function, which was conventionally implemented by a combination of a plurality of semiconductor chips including AS (Application Specified) IC part, to be realized on a single semiconductor chip. Thus, not only reduction in volume, but also reduction in energy consumption, has been made possible.

Wide Area Wireless Communication Networks

Wide area wireless communication networks typically for PHSs (Personal Handy phone Systems) and portable telephones have been installed, and portable telephone terminals have rapidly been diffused. This permits network communication without the restrictions of place. Communication bandwidth is also enormously becoming larger with the adoption of IMT-2000 specification.

Furthermore, i-mode service by NTT DoCoMo, EZ-Access by IDO, etc., although having some restrictions, enable access to Internet information services via their respective wide area wireless networks.

Portable Telephone Terminals

Recent development of mounting technology has achieved a great miniaturization of terminals for connection to portable telephone networks, which are wide area wireless communication networks provided by NTT DoCoMo and others.

Further, portable telephone terminals supporting i-mode service by NTT DoCoMo, EZ-Access by IDO, and the like have, though with some restrictions, are also capable of using Internet information services.

Furthermore, these portable telephone terminals are provided with a function of playing individually set melodies at the time of incoming calls. This function is called "ring tones". Some portable telephone terminals have the capability of playing not only melodies of simple tones but also melodies of chords as ring tone melodies.

Still furthermore, with regard to IMT-2000 which is a next generation portable telephone system, a specification for mounting a user identification device referred to as UIM (User Identity Module), on a portable telephone terminal has been disclosed.

In order to cope with IMT-2000 portable telephone services, attempts have been made to enhance the capability of portable telephone terminals. Processors and memories to be mounted on portable telephone terminals have been reinforced, and further, memory capacities have been increased.

Text processing functions for e-mail etc. have been enhanced. Terminals with a predictive text input function such as T9 have been announced.

Browser software has advanced and enhanced in functions as well. Browsers for portable telephone terminals primarily have the capability of displaying pages for portable telephone terminals. These pages are described in WML (Wireless Markup Language) for WAP (Wireless Application Protocol) terminals, compact HTML for i-mode terminals, or XHTML Basic recommended by W3C.

Furthermore, portable telephone terminals equipped with a Java processing system are available on the market, which can execute programs downloaded from networks.

Portable telephones equipped with Bluetooth as an energy saving communication system, are also available on the market.

Download of Programs by Portable Telephone Terminals

Devices for downloading application programs, which operate on portable telephone terminals, from servers on networks are available. More specifically, such devices include specifications of i-applied by NTT DoCoMo, the Profile MIDP (Mobile Information Device Profile) of J2ME (Java 2 Platform, Micro Edition) employed by KDDI Group and J-PHONE Group for portable telephones, and so on.

This makes it possible to provide portable telephone terminals with functions that were not provided at the time of production of the portable telephone terminals.

In BREW specifications presented by QUALCOMM Inc. (US), it is possible to execute not only programs by Java processing systems but also programs described in C/C++.

Low Power Consuming Wireless Communication Systems

Progress in technologies of communication frequency control circuits, functions of adjusting radio wave strength, and others has realized fast communication systems with low power consumption. Many information apparatuses including portable telephone terminals and note type PCs (Personal computers) are coming to employ these communication systems.

Bluetooth is a typical low power consuming wireless communication system as described above. Particularly, Bluetooth SIG (Special Interest Group), who leads this Bluetooth system, specifies a combination of protocol stacks as a profile for each application using communication, for the purpose of spreading and promotion of the system, and in addition, secures the inter-connectability between Bluetooth-based devices. For example, according to "Dial-up Networking Profile" included in the Bluetooth specifications, a communication protocol, a communication procedure, etc. are specified for the case of using portable telephone terminals and the like as an Internet bridge.

Furthermore, in the Bluetooth specifications, a protocol (SDP: Service Discovery Protocol) and a profile (Service Discovery Application Profile) for a service discovery function are defined. Thus, on a Bluetooth network formed dynamically by wireless communication, the services that are provided by devices connected to the network can easily be found.

Still furthermore, in the Bluetooth specifications, a 48 bit data format referred to as BD_ADDR (Bluetooth Device Addresses; 48 bits) is used for addresses in order to identify individual devices.

External Memory Devices

Progress in semiconductor manufacturing technology and storage circuit systems etc. has greatly increased the storage capacity of memory devices. Particularly in recent years, standardized external memory devices have become available for use between various information apparatuses, and accordingly, a great deal of information can easily be exchanged via these external memory devices.

Internet Information Services

Various kinds of information are now available through the Internet. The information includes image data, text data, video and audio signals, etc., wherein the information can be distributed with a description system referred to as HTML (Hyper Text Markup Language). Also, connection providers called ISPs (Internet Service Providers) offer easy connection to the Internet via wide area communication networks such as telephone networks.

As these Internet information services have come to be provided via the wide area communication networks spread all over the world, it has been made possible to acquire a large amount of information in real time at any place.

In addition, i-mode by NTT DoCoMo permits using Internet information services even with portable telephone terminals with various hardware restrictions compared to PCs by adopting a subset of HTML referred to as compact HTML.

Small-sized Large-capacity Batteries

With the appearance of lithium ion batteries, lithium polymer batteries, etc., high power density batteries, in other words, small-sized large-capacity batteries have come to be available. This makes it possible to continuously use portable apparatuses for a long time.

Wired Data Communication Interfaces

Wired data communication interfaces represented by USB (Universal Serial Bus), IEEE1394, etc. are diffused as external interfaces for information apparatuses, particularly for PCs.

Encryption Technology

Methods of secret and secure data communication with encryption algorithms are established. In general, encryption algorithms can be categorized into a symmetrical key system using the same key information for encryption and decryption, and an asymmetrical key system using different key information for encryption and decryption. The both systems adopt a DES (Data Encryption Standard) encryption system, an RC4 encryption system, an RSA (the initials of the three developers': Rivest Shamir Adleman) encryption system, and so on. Also, it is possible to sign information or confirm it, using an asymmetrical encryption system (public key encryption system).

Secure Communication Technology

As a protocol that provides security in communication such as Web access with HTTP, SSL (Secure Socket Layer) was presented by Netscape Inc. (USA), and has been used in various kinds of software including the browser software by them. SSL is positioned above TCP/IP (Transmission Control Protocol/Internet Protocol) and below an application protocol such as HTTP (Hyper Text Transfer Protocol) or FTP (File Transfer Protocol), etc., providing the functions of server authentication, encryption of communication data, and client authentication (optional).

As a system that provides security in wireless communication, WTLS (Wireless Transport Layer Security) is defined by a WAP Forum as a part of WAP (Wireless Application Protocol). This is designed on the basis of SSL, and provides almost the same functions as those of SSL, including data integrity, encryption, terminal authentication, etc.

As a method that provides an authentication function in communication, the CHAP (Challenge-Handshake Authentication Protocol) system defined as RFC1334 is known. This system is primarily used in PPP (Point-to-Point Protocol: defined by RFC1661).

By using various peripheral technologies as described above, it has been realized that portable terminals have multi functions, including communication functions etc., and are smaller and more portable.

Conventional portable telephone terminals, however, have been forced to have a small display screen for their portability, which has sometimes made it difficult to display various contents extensively distributed on the Internet.

In addition, using optical magnification systems for a better screen displaying has caused a mismatch with the operating systems of conventional portable telephone terminals to make the browsing of contents difficult.

SUMMARY OF THE INVENTION

It is an object of the present invention to provide a communication apparatus and a control method therefor, an information apparatus and a control method therefor, a communication system, and control programs for implementing the methods, which make it possible to properly process data acquired by an external device even if the data is difficult to process by the external device that acquired the data.

To attain the above object, in a first aspect of the present invention, there is provided a communication apparatus comprising an acquiring device that acquires information from an external apparatus by communication, a determination device that determines whether the information acquired by the acquiring device is suitable for processing by the communication apparatus, and a delegation device that delegates processing of information determined by the determination device to be unsuitable for processing by the communication apparatus to an information apparatus.

Typically, the communication apparatus comprises a portable telephone terminal.

Also typically, the acquiring device acquires information managed by a server on a network.

Preferably, the determination device determines whether the information acquired by the acquiring device is suitable for processing by the communication apparatus by comparing a size of display required by the information with a size of a display screen of the communication apparatus.

Alternatively, the determination device determines the information acquired by the acquiring device to be unsuitable for processing by the communication apparatus, if a processing amount of the information is greater than a predetermined amount.

Also preferably, determination device determines the information acquired by the acquiring device to be unsuitable for processing by the communication apparatus, if the information is encrypted with an encryption system that is not provided on the communication apparatus.

Also preferably, the determination device determines the information acquired by the acquiring device to be unsuitable for processing by the communication apparatus, if the information is to be processed with plug-in software that is not provided on the communication apparatus.

Also preferably, the determination device determines whether the information acquired by the acquiring device is suitable for processing by the communication apparatus, according to at least one of a data format and an extension of the information.

Also preferably, the determination device determines whether the information acquired by the acquiring device is suitable for processing by the communication apparatus, according to a result of analysis of contents of the information.

Preferably, the delegation device delegates a part of the information acquired by the acquiring device to be processed by the information apparatus, if the part of the information is determined by the determination device to be unsuitable for processing by the communication apparatus.

Alternatively, the delegation device is responsive to a result of the determination by the determination device that the information acquired by the acquiring device is unsuitable for processing by the communication apparatus, for storing the information and displaying the result of the determination, and for delegating processing of the information to the information apparatus after an instruction to delegate the processing is given.

Also preferably, the delegation device delegates at least one parameter for processing the information acquired by the acquiring device together with the information to the information apparatus to delegate processing of the information.

Preferably, the delegation device includes a designation device that designates the information apparatus as a delegate destination.

More preferably, the designation device designates the information apparatus as a delegate destination according to determination conditions applied for the determination by the determination device.

Specifically, it is preferred that the designation device carries out the designation using a table in which candidates for the information apparatus as a delegate destination is registered in correspondence to determination conditions to be applied for the determination by the determination device.

Preferably, the designation device includes an updating device that updates contents of registration of the table.

Preferably, the communication apparatus comprises an instruction device that instructs the information apparatus to process the information after the delegation device delegates processing of the information to the information apparatus.

Preferably, at least one of the determination device and the delegation device is implemented by a program acquired by communication.

Also preferably, the communication apparatus comprises an acception device that accepts a request for registration as a delegate destination made from the information apparatus together with indication of at least attributes of information that can be processed by the information apparatus.

To attain the above object, in a second aspect of the present invention, there is provided a method of controlling a communication apparatus, comprising an acquiring step of acquiring information from an external apparatus by communication, a determination step of determining whether the information acquired by the acquiring step is suitable for processing by the communication apparatus, and a delegating step of delegating processing of information determined by the determination step to be unsuitable for processing by the communication apparatus to an information apparatus.

To attain the above object, in a third aspect of the present invention, there is provided an information apparatus comprising an acquiring device that waits for information to be delegated to the information apparatus and acquires the information, wherein the information was acquired by a communication apparatus from an external apparatus and then determined to be delegated to the information apparatus for processing, as being unsuitable for processing by the communication apparatus, and an executing device that executes processing of the information delegated to the information apparatus and acquired by the acquiring device.

To attain the above object, in a fourth aspect of the present invention, there is provided a method of controlling an information apparatus, comprising an acquiring step of waiting for information to be delegated to the information apparatus and acquires the information, wherein the information was acquired by a communication apparatus from an external apparatus and then determined to be delegated to the information apparatus for processing, as being unsuitable for processing by the communication apparatus, and an executing step of executing processing of the information delegated to the information apparatus and acquired in the acquiring step.

To attain the above object, in a fifth aspect of the present invention, there is provided a communication system comprising a communication apparatus connectable to a wide area network, and an information apparatus connected to the communication apparatus for communication therewith, wherein the communication apparatus includes: a first acquiring device that acquires information from the wide area network by communication, a determination device that determines whether the information acquired by the first acquiring device is suitable for processing by the communication apparatus, and a delegation device that is responsive to a result of the determination by the determination device that the acquired information is not suitable for processing by the communication apparatus, for delegating processing of the information to the information apparatus, and the information apparatus includes: a second acquiring device that waits for the information having processing thereof delegated by the delegation device to be delegated to the information device, and an execution device that executes the delegated processing on the information acquired by the second acquiring device.

To attain the above object, in a sixth aspect of the present invention, there is provided a control program executed by a communication apparatus, comprising an acquiring module for acquiring information from outside by communication, a determination module for determining whether the information acquired by the acquiring module is suitable for processing by the communication apparatus, and a delegate module for delegating processing of information determined by the determination module to be unsuitable for processing by the communication apparatus to an information apparatus.

To attain the above object, in a seventh aspect of the present invention, there is provided a control program executed by a communication apparatus having a function of acquiring information from a wide area network by communication, and an information apparatus connected to the communication apparatus for communication therewith, the control program comprising an acquiring module for waiting for information to be delegated to the information apparatus and acquiring the information, wherein the information was acquired by the communication apparatus from the wide area network and then determined to be delegated to the information apparatus for processing, as being unsuitable for processing by the communication apparatus, and an executing module for executing processing of the information delegated to the information apparatus and acquired by the acquiring module. To attain the above object, in an eighth aspect of the present invention, there is provided a medium that computer-readably contains a control program according to the sixth aspect.

To attain the above object, in a ninth aspect of the present invention, there is provided a medium that computer-readably contains a control program according to the seventh aspect.

The above and other objects, features, and advantages of the invention will become more apparent from the following detailed description taken in conjunction with the accompanying drawings.

BRIEF DESCRIPTION OF THE DRAWINGS

FIGS. 1A to 1C are views showing the appearance of a portable information terminal 100 as an information apparatus according to the present invention, in which:

FIG. 1A is a perspective view of the portable information terminal 100;

FIG. 1B is a front view of the portable information terminal 100; and

FIG. 1C is an enlarged view illustrating the portable information terminal 100 gripped with a hand;

FIG. 20 is a diagram showing a remote input conversion table used by the fourth embodiment.

DETAILED DESCRIPTION OF THE PREFERRED EMBODIMENTS

The present invention will now be described in detail below with reference to the accompanying drawings showing preferred embodiments thereof.

Figure 1:
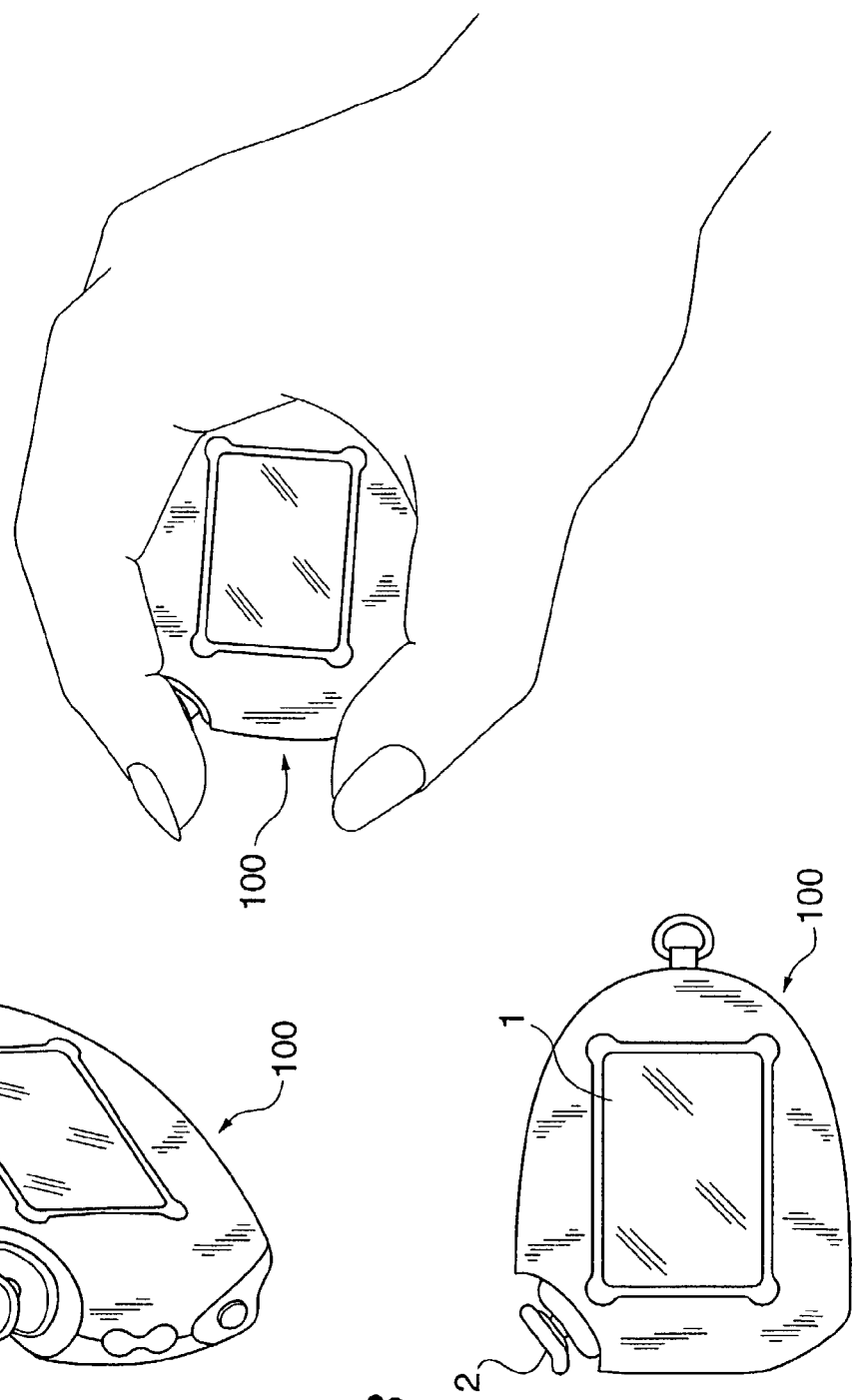
Figure 5:
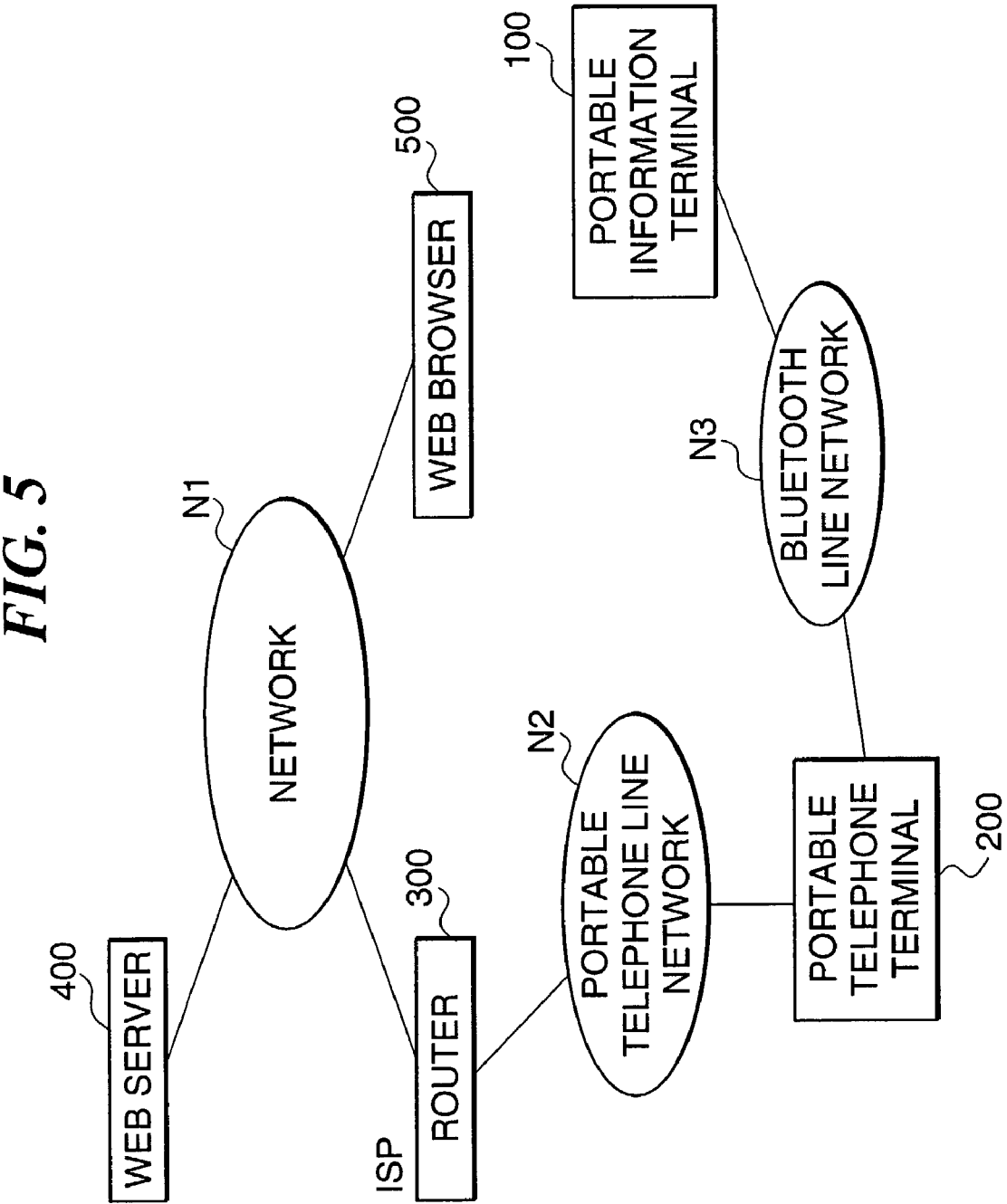
FIG. 5 is a diagram showing the arrangement of a communication system according to a first embodiment of the present invention.

In the embodiments described below, the communication apparatus according to the present invention is embodied as a portable telephone terminal 200 as shown in FIG. 5, described later, and the information apparatus according to the present invention is embodied as a portable information terminal 100 as shown in FIGS. 1A to 1C, described later.

First Embodiment

In a first embodiment of the present invention, when large-sized image data (for example, detailed map information), which is difficult to display on a small-sized screen of a portable telephone terminal, is included in a Web page downloaded with a Web browser of the portable telephone terminal, the Web page information is transmitted to a portable information terminal, and a process of displaying the Web page information including the image is delegated (transferred) to the portable information terminal. These functions will be described in details as follows.

FIGS. 1A to 1C are views showing the appearance of the portable information terminal 100, wherein FIG. 1A is a perspective view of the portable information terminal, FIG. 1B is a front view, and FIG. 1C shows the portable information apparatus gripped with a hand.

In FIGS. 1A to 1C, a window 1 is formed in a front part of the portable information terminal 100 on the eyepiece side of a Free-Form-Surface 111, described later. While gripping the portable information terminal 100 with a hand, a user can see, by looking in the window 1 with the eyes close to it, an image displayed on a small-sized liquid crystal display 112, referred to later, on an enlarged scale. Since this portable information terminal 100 is powered by a battery and provided with a wireless communication function, the user can acquire necessary information and see the enlarged image, with the portable information terminal held in hand.

Further, as shown in FIG. 1B, an operation button 2 is provided at a left top of the terminal as viewed from the front, and the user, as shown in FIG. 1C, operates the operation button 2 to acquire desired information.

Figure 2:
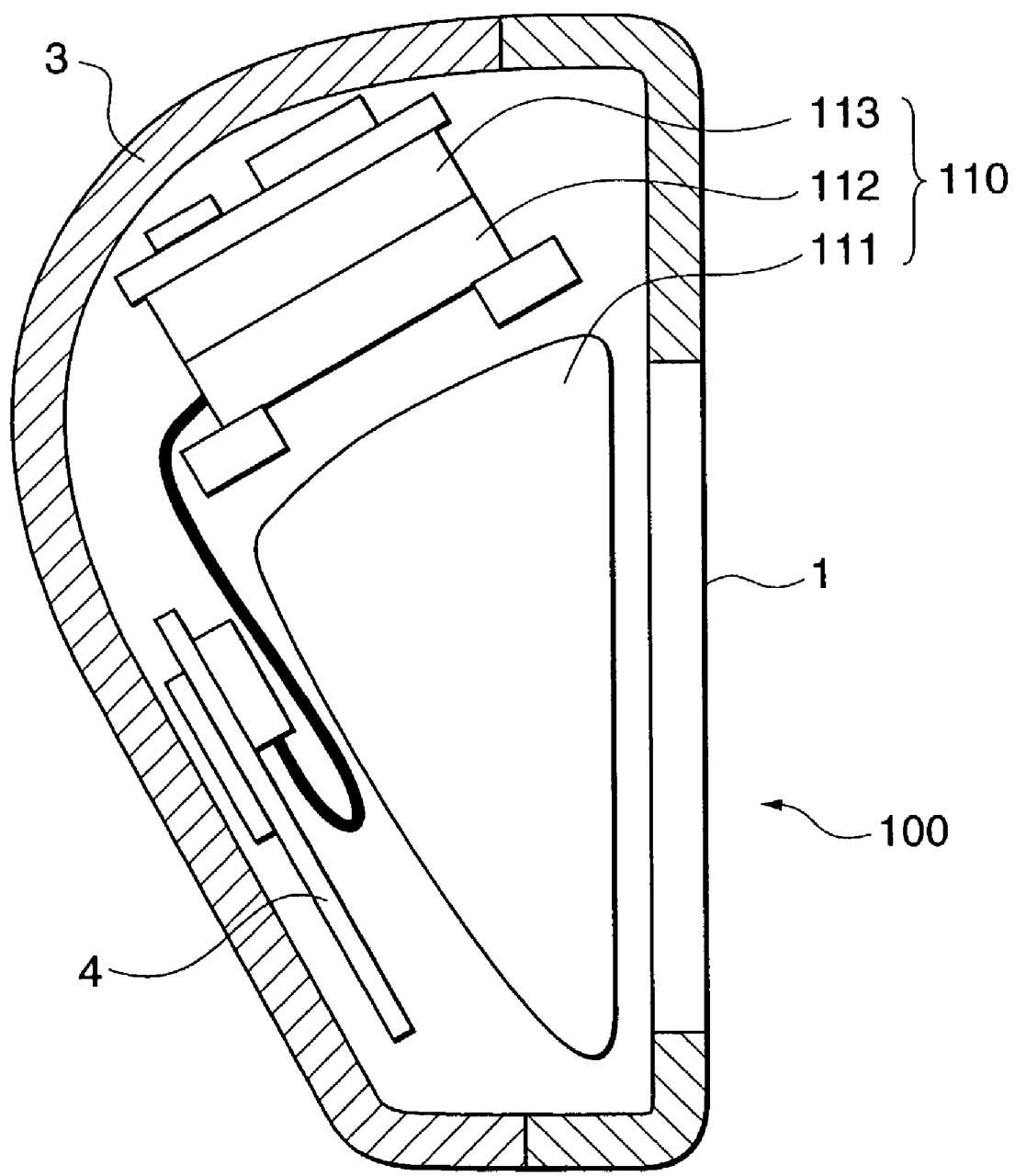
FIG. 2 is a sectional view showing the internal configuration of the portable information terminal 100.

FIG. 2 is a sectional view showing the internal configuration of the portable information terminal 100.

In FIG. 2, reference numeral 112 designates a small-sized liquid crystal display for displaying information, 113 designates a backlight for supplying transmission light to the small-sized liquid crystal display 112, and 111 designates a Free-Form-Surface prism for magnifying the screen of the small-sized liquid crystal display 112. The small-sized liquid crystal display 112, the backlight 113, and the Free-Form-Surface prism 111 constitute a magnification system display device 110.

Further, reference numeral 3 designates a housing of the portable information terminal 100, and 4 designates a main substrate having mounted thereon a circuit for transmitting a driving signal to the small-sized liquid crystal display 112, etc.

Figure 3:
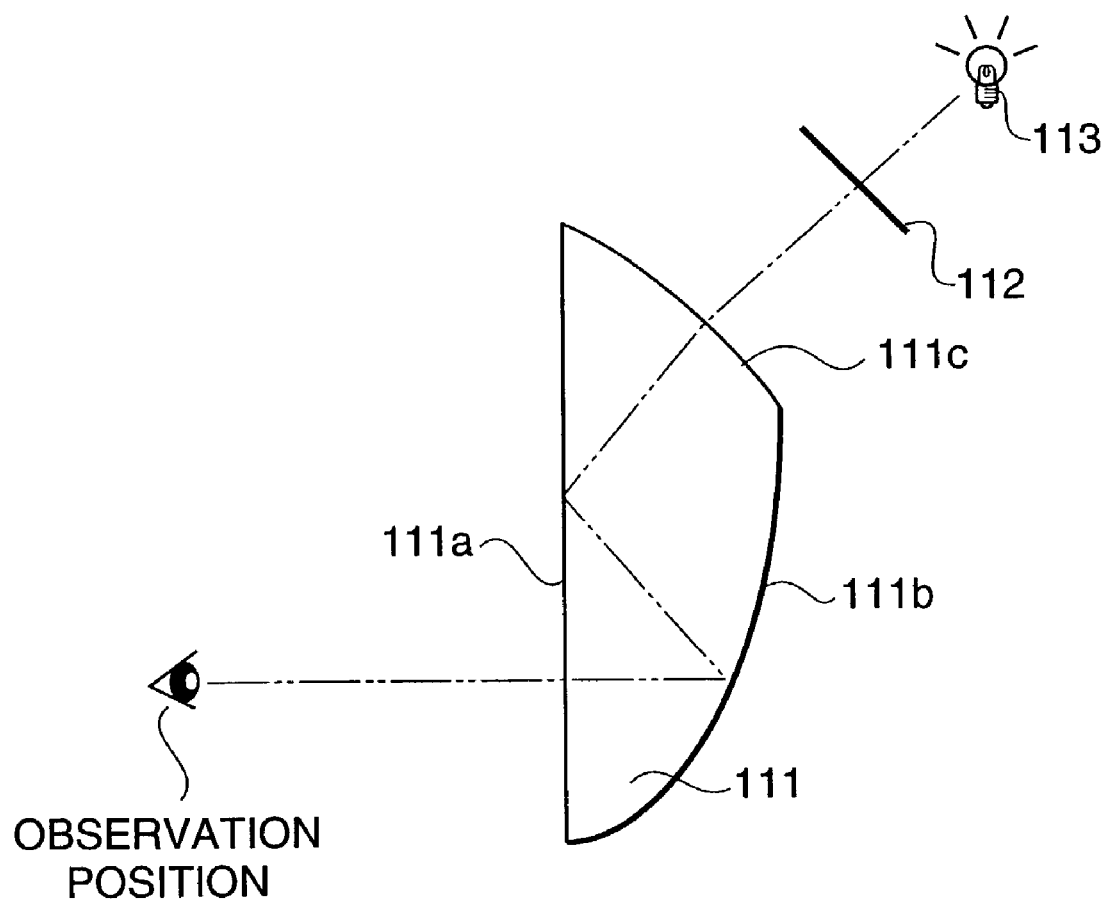
FIG. 3 is a diagram showing an optical path in a Free-Form-Surface prism 111 inside the portable information terminal 100.

FIG. 3 is a diagram showing an optical path in the Free-Form-Surface prism 111 inside the portable information terminal 100.

On the Free-Form-Surface prism 111, three optical action surfaces 111a to 111c are formed. In the vicinity of the action surface 111c, which is farthest from the user, the small-sized liquid crystal display 112 and the backlight 113 are arranged, wherein their positions are adjusted so that they give a proper display to the user. The respective action surfaces 111a to 111c are designed such that the light emitted by the backlight 113 transmits through the small-sized liquid crystal display 112, and goes by way of the action surfaces 111c, 111a, and 111b sequentially to reach the user. Using this Free-Form-Surface prism 111 realizes an optical magnification system in a compact size, for displaying output image on an enlarged scale.

In the present embodiment, although a transmission type liquid display element is used as the small-sized liquid crystal display 112, a reflection type liquid display element may be used, instead, and the shape of the Free-Form-Surface prism, the position of the backlight, etc. may be adjusted as needed.

Figure 4:
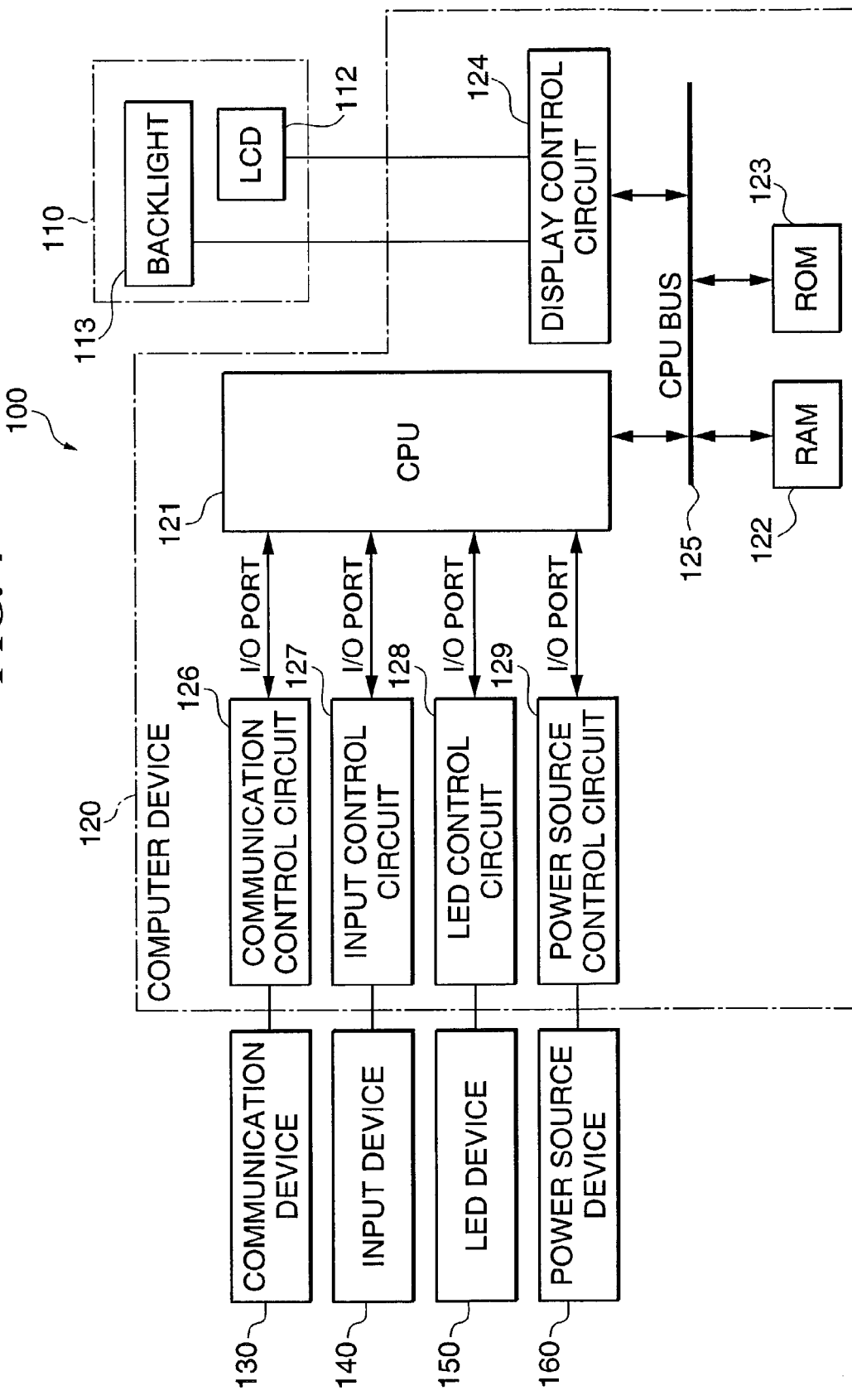
FIG. 4 is a block diagram showing the hardware construction of the portable information terminal 100.

FIG. 4 is a block diagram showing the hardware construction of the portable information terminal 100.

The portable information terminal 100 is comprised of the magnification system display device 110 having the small-sized liquid crystal display (LCD) 112, backlight 113, etc., a small-sized computer device 120 integrated by the SoC technology, a low power consuming communication device 130 according to Bluetooth, an input device 140 which is composed of a combination of a pressure sensitive element, a tact switch, etc. so as to allow pointing and button clicking on a two dimensional plane, which are equivalent to those of a pointing device (mouse), an LED device 150 capable of realizing a plurality of display patterns by selective lightening and flickering, and a power source device 160 composed of a lithium ion secondary battery or the like. These components are mounted in the portable information terminal 100 that is so small in size as can be gripped in a hand.

This portable information terminal 100 operates such that the computer device 120 processes information acquired from a network via the communication device 130, and the resulting information is displayed via the magnification system display device 110.

The computer device 120 is comprised of a CPU 121 that executes various processes based on programs, described later, a RAM 122 that serves as a memory for expanding the programs, holding temporary results of the processing, etc., a ROM 123 that stores software including the programs and data, a display control circuit 124 that controls the small-sized liquid crystal display 112, which displays results of execution of the programs, and the backlight 113, a bus (CPU Bus) 125, that serves as a data communication path between devices, for example, between the CPU 121 and the RAM 122, a communication control circuit 126 that controls the communication device 130, an input control circuit 127 that controls the input device 140, an LED control circuit 128 that controls the LED device 150, and a power source control circuit 129 that controls the power source device 160.

Among these components, the RAM 122, the ROM 123, and the display control circuit 124 are connected to the CPU 121 via the bus 125. The communication control circuit 126, the input control circuit 127, the LED control circuit 128, and the power source control circuit 129 are connected to the CPU 121 via I/O ports. The computer device 120 having these devices, circuits, etc. is mounted on a single small-sized semiconductor chip by means of the SoC technology.

The ROM 123 employed in the above configuration includes an unrewritable storage device such as a mask ROM and a rewritable storage device such as a flash ROM.

FIG. 5 illustrates a communication system according to the first embodiment of the present invention.

A plurality of Web servers 400 are present on a network N1 such as the Internet. A portable telephone terminal 200 according to the present embodiment is connected to the Web servers 400 via a portable telephone line network N2.

The portable telephone terminal 200 has a connection function of connecting to a Bluetooth line network N3 in addition to a connection function of connecting to the portable telephone line network N2. In Bluetooth communication between the portable information terminal 100 and the portable telephone terminal 200, communication is carried out according to Serial Port Profile.

Although the portable telephone line network N2 is actually comprised of a plurality of radio base stations and exchange facilities, the details of the portable telephone line network N2 will not be described here for brevity. Extension of communication from the portable telephone line network N2 to the network N1 is carried out through a router 300. The router 300 is mostly operated by ISP (Internet Service Provider), and plays the role of a bridge between the portable telephone line network N2 and the network N1.

An access request for access to a Web page, made by the portable telephone terminal 200 is transmitted to a corresponding Web server 400, and upon receipt of this request, information on the Web page is returned from the Web server 400. The portable telephone terminal 200 then analyzes and displays the received information on the Web page.

Further, a plurality of Web browsers 500 are connected to the network N1, and can be connected to Web servers 400 as well to display information on Web pages stored therein.

The Web servers 400 and Web browsers 500 are servers and browsers equipped with widely diffused Web technologies, wherein information on Web pages stored therein is described in HTML or the like, and includes link information described as URLs. The link information makes it easy to access from a Web browser 500 or the like to other Web page information, which may be stored in the same Web server or in a different Web server.

The network N1 shown in FIG. 5 may be an intranet operated in a company or an organization, or may be the Internet widely connecting the world.

Figure 6:
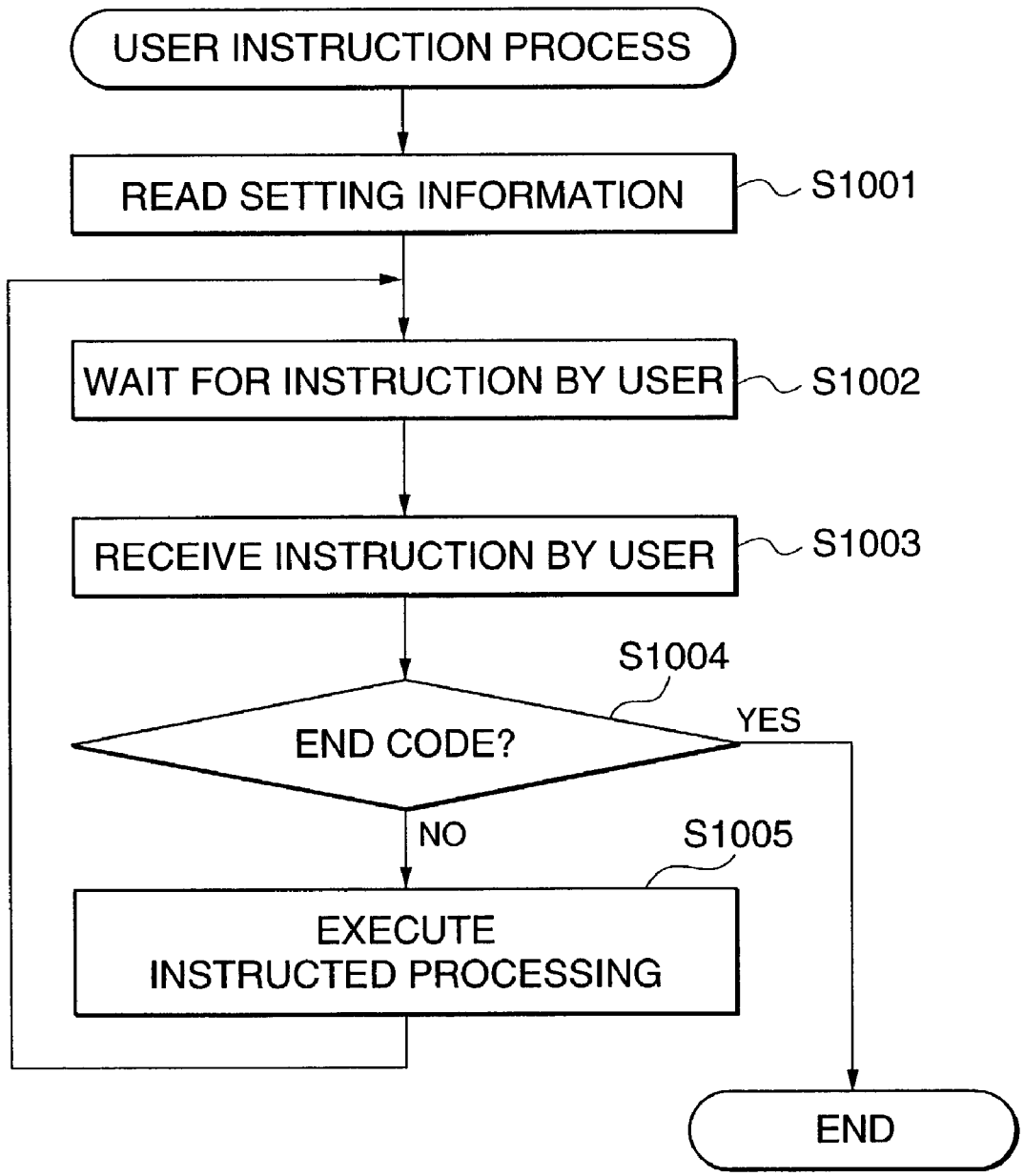
FIG. 6 is a flowchart of a user instruction process performed by the portable information terminal 100 according to the first embodiment.

FIG. 6 is a flowchart of a user instruction process performed by the portable information terminal 100 according to the first embodiment.

A program describing this operation procedure is stored in the ROM 123 shown in FIG. 4, and is executed by the CPU 121 as needed. Upon execution of the program, the input control circuit 127, the display control circuit 124, the communication control circuit 126 etc. are started as needed.

First, information on settings (setting information) is read in step S1001 at the start of the program. According to this setting information, the contents of processing to be executed thereafter are decided. The contents of the setting information are stored in the ROM 123. Typical set information is fixed and stored in the ROM 123 together with the programs etc., and the user sets or modifies part of the setting information, which is then stored in a different area of the ROM 123.

Next, in step S1002, an instruction by the user is waited for. Herein, the instruction by the user is typically made in the form of an input signal from the input device 140, but may be made in the form of communication data received from the communication device 130.

In step S1003, an instruction by the user is received.

In step S1004, it is determined whether the received instruction instructs the program to be terminated or not. If the instruction is determined to instruct the program to be terminated, the program is terminated. If the instruction is not determined to instruct the program to be terminated, then the process proceeds to step S1005.

In step S1005, processing according to the instruction is executed, and then the process goes back to step S1002 to wait for a next instruction. The program for the processing executed in step S1005 is stored in the ROM 123 as well, and executed by the CPU 121.

In the case where in a Web page that the Web browser of the portable telephone terminal 200 according to the present embodiment has downloaded, image data (e.g. detailed map information) that is too large to be displayed on the small-sized screen of the portable telephone terminal 200 is detected, then the information on the Web page is delegated to the portable information terminal 100, which was described by referring to FIGS. 1A to 4, and is provided with the optical magnification system having the Free-Form-Surface prism 111, in order to delegate the process of displaying the Web page information including the image to the portable information terminal 100. An example of this case will be described hereinbelow.

In this case, the portable information terminal 100 is on standby, waiting for communication from the portable telephone terminal 200, and upon receipt of communication from the portable telephone terminal 200, processing described below is started.

Figure 7:
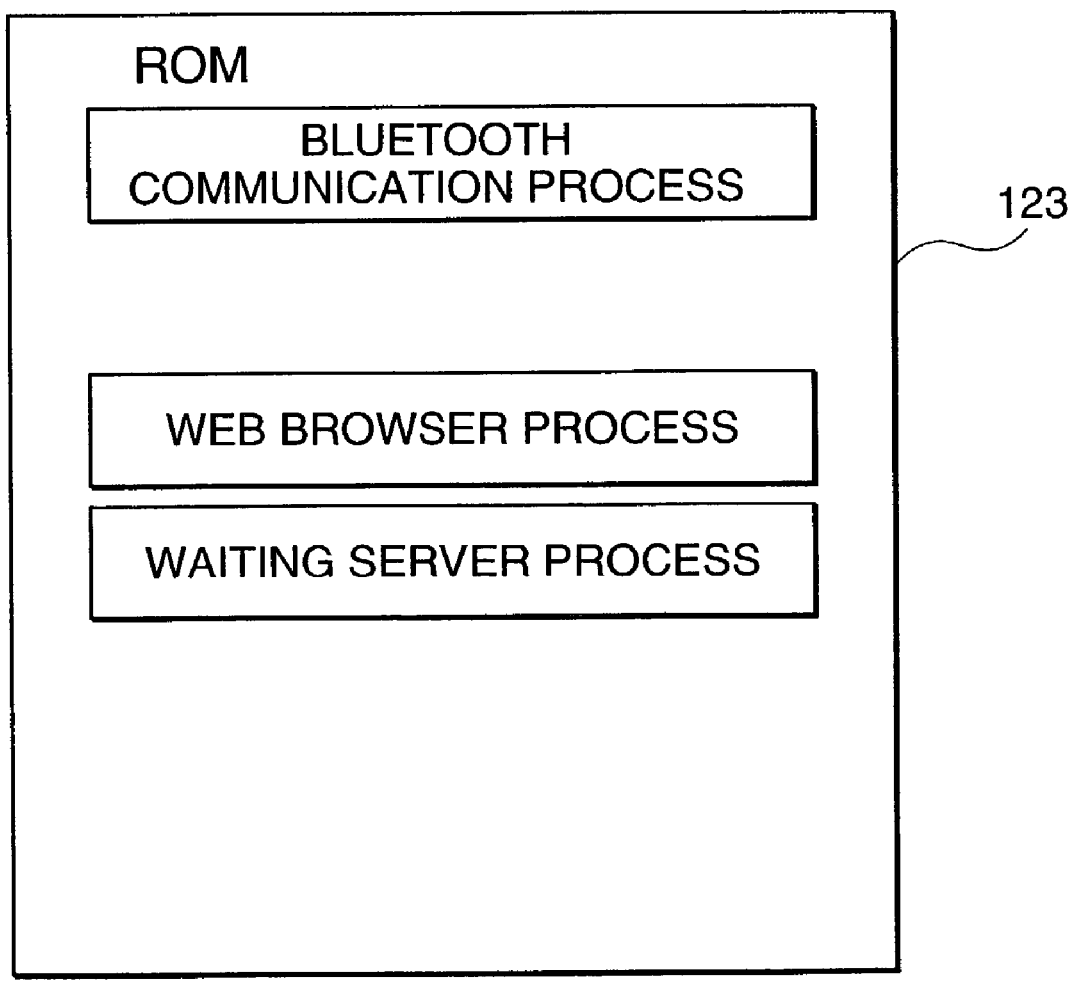
FIG. 7 is a diagram showing the software configuration of the portable information terminal 100.

The software configuration of the portable information terminal 100 includes, as shown in FIG. 7, a group of programs having a Web browser processing function, a Bluetooth communication function for communication with the portable telephone terminal 200, etc., and additionally, a program having a "waiting server function" of waiting for communication from the portable telephone terminal 200. This program is also stored in the ROM 123 to be executed by CPU 121 as needed. And, transmission and reception of data to and from the input control circuit 127, the display control circuit 124, the communication control circuit 126, etc. are carried out as needed.

Figure 8:
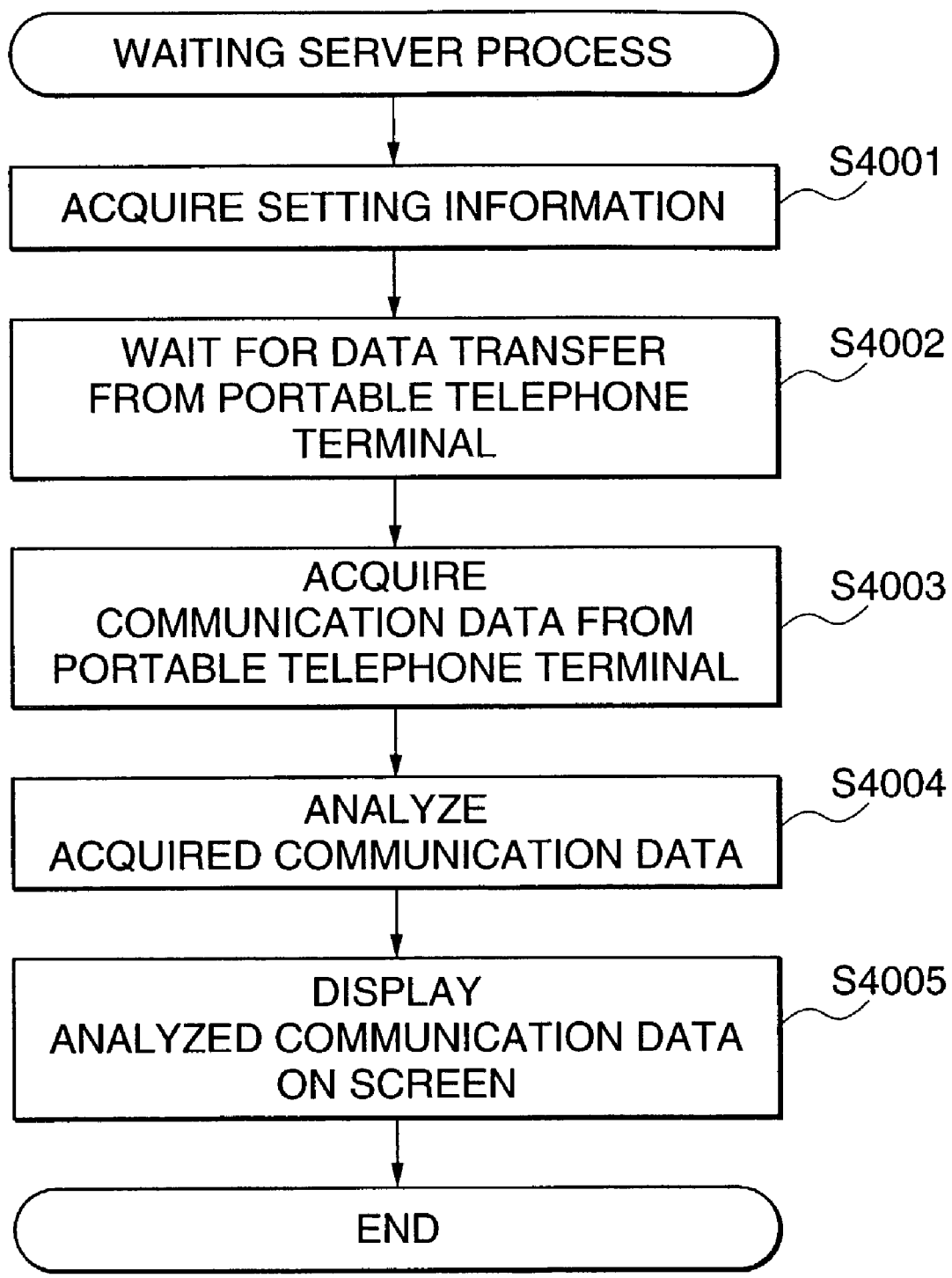
FIG. 8 is a flowchart showing a waiting server process performed by the portable information terminal 100 according to the first embodiment.

FIG. 8 is a flowchart of a waiting server process performed by the portable information terminal 100 according to the first embodiment. A program describing this process is called to be executed in step S1005 in FIG. 6 in response to an instruction by the user or to communication from the portable telephone terminal 200.

An instruction by the user mentioned above is given, for example, when starting of the waiting server process is selected by an instruction through a menu operation.

First, in step S4001, setting information for the waiting server is acquired.

In step S4002, data delegate from the portable telephone terminal 200 is waited for. Specifically, the portable information terminal 100 is suspended until the communication device 130 receives communication data from the portable telephone terminal 200.

In step S4003, the communication data from the portable telephone terminal 200 received by the communication device 130 is acquired. In step S4004, the acquired data is analyzed. Specifically, the contents described in HTML format or the like is read, an image, other multimedia information, anchor (link information), etc. embedded therein are detected, and then a logical structure of the Web page information is determined.

Figure 13:
FIG. 13 shows an example of display, on the portable information terminal 100, of a whole Web page of which display processing has been delegated from the portable telephone terminal 200.

In step S4005, the analyzed communication data is displayed on the screen (see FIG. 13), and then the process is terminated. In the step S4005, specifically, based on the various embedded information and the logical structure as the analysis results, the acquired Web page information is laid out in a suitable disposition, and then the result of the layout is displayed on the small-sized liquid crystal display 112. Before and after the step S4005, processing of reducing power supply to the liquid crystal display and giving a notification to the user may be carried out to save power consumption, but details of the processing will not be described here.

Next, functions of the portable telephone terminal 200 according to the present embodiment will be explained with reference to FIG. 9.

Figure 9:
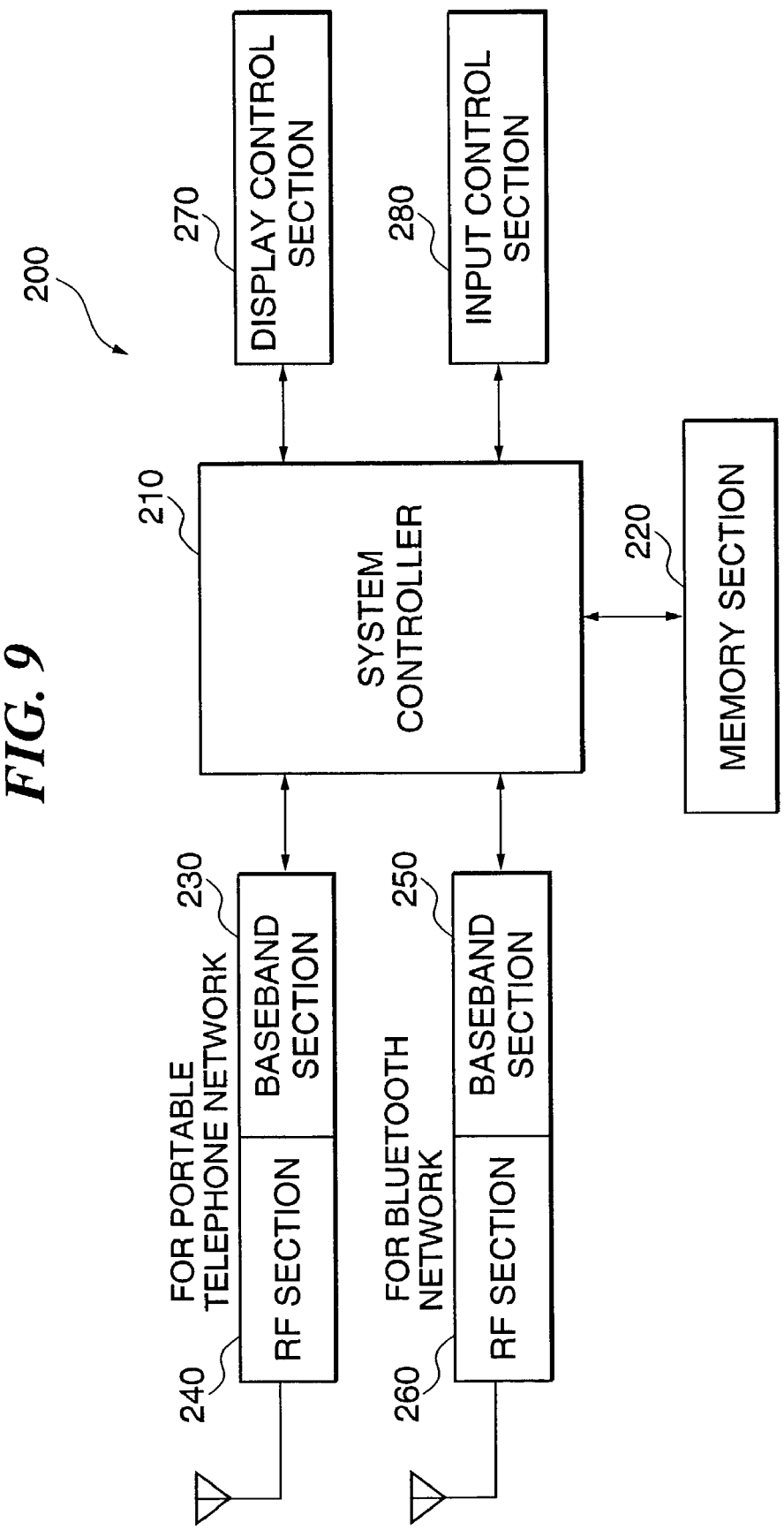
FIG. 9 is a block diagram showing functions of a portable telephone terminal 200 as a communication apparatus according to the first embodiment of the present invention.

FIG. 9 is a block diagram showing functions of the portable telephone terminal 200 according to the first embodiment. Herein, since a system controller 210 of the portable telephone terminal 200 has almost the same functions as those of the small-sized computer device 120, shown in FIG. 4, of the portable information terminal 100 except that the magnification system display device 110 is not provided, description of the related functions of the system controller 210 in FIG. 9 is omitted.

The portable telephone terminal 200 is comprised of the system controller 210, a memory section 220, an RF section 240 and a baseband section 230 for connection to the portable telephone line network N2 shown in FIG. 5, an RF section 260 and a baseband section 250 for connection to the Bluetooth line network N3 shown in FIG. 5, a display controller 270, and an input controller 280.

The portable telephone terminal 200 utilizes these functions to realize a data communication function and a mobile communication function, as well as Web browser functions.

The Web browser functions provided on the portable telephone terminal 200 according to the present embodiment include, in addition to general Web browser functions widely used for portable telephone terminals, a function of detecting data that is unsuitable (difficult) for processing by the portable telephone terminal 200, and delegating processing of the data to the portable information terminal 100 to assign the processing to the latter.

Figure 10:
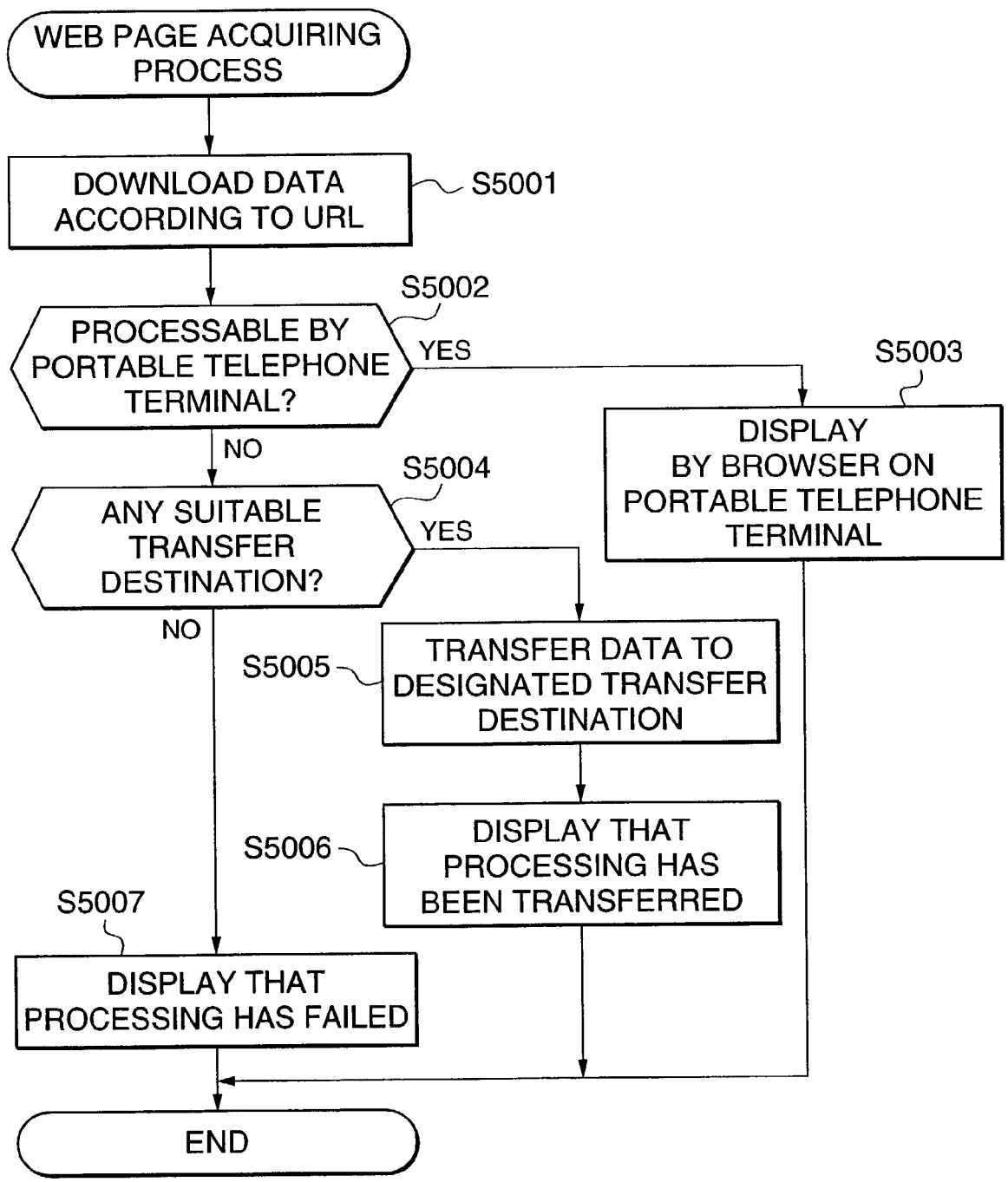
FIG. 10 is a flowchart showing a Web page acquiring process (delegate process) performed by the portable telephone terminal 200 according to the first embodiment.
Figure 11:
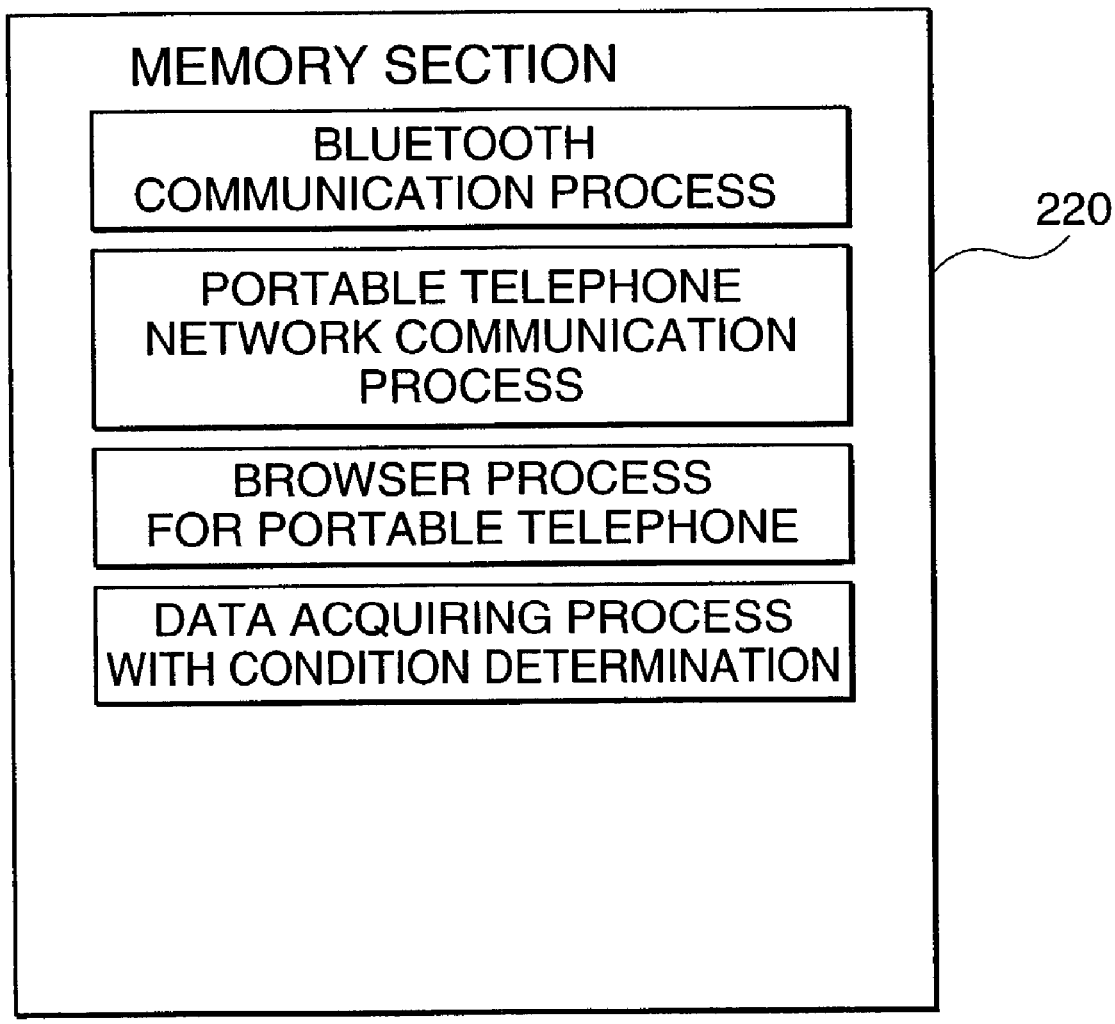
FIG. 11 is a diagram showing the software configuration of the portable telephone terminal 200 according to the first embodiment.

FIG. 10 is a flowchart showing a Web page acquiring process (delegate process) performed by the portable telephone terminal 200 according to the first embodiment. A program describing this processing is stored in the memory section 220 (see FIG. 11) of the portable telephone terminal 200, and called as a data acquiring routine when performing the data acquiring process, to realize a delegate determination process specific to the first embodiment.

First, in step S5001, data is downloaded according to a designated URL. The URL may be designated through direct input by the user, or may be acquired by selecting a link embedded in a different Web page, or may be provided by a portable telephone network provider or the like.

In step S5002, it is determined whether the acquired data is processable by the portable telephone terminal 200 or not. If the data is determined to be processable, then the process proceeds to step S5003, or otherwise the process proceeds to step S5004.

In the present embodiment, if image data that has a size larger than the display screen size of the portable telephone terminal 200 is acquired, then the acquired data is determined to be unprocessable, or otherwise the acquired data is determined to be processable.

Figure 12A:
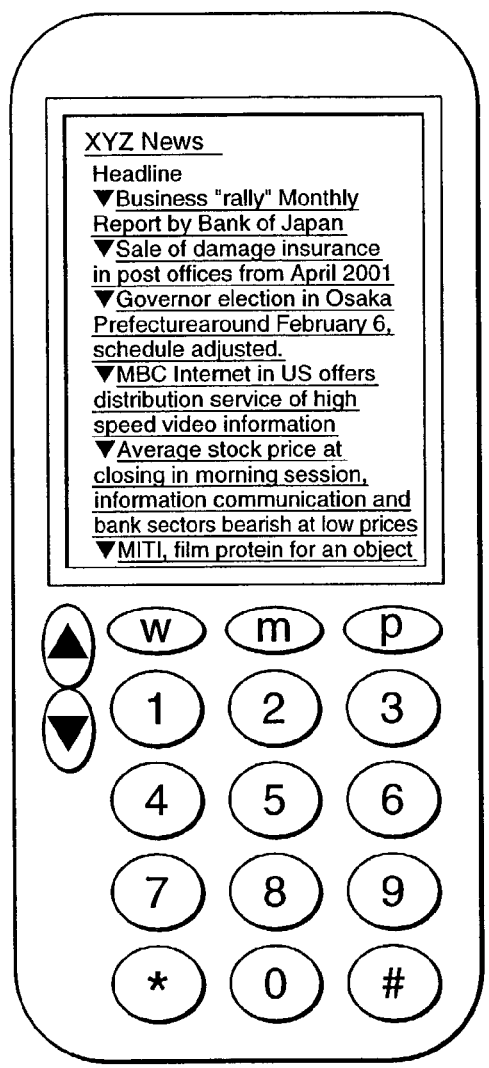
FIGS. 12A and 12B show examples of display on the portable telephone terminal 200.

In step S5003, the acquired data is analyzed by the browser of the portable telephone terminal 200 and displayed (see FIG. 12A), and then the process is terminated.

In step S5004, it is determined whether there is a suitable delegate destination or not with regard to the acquired data. If there is a suitable delegate destination, the process proceeds to step S5005, or otherwise the process proceeds to step S5007. In the present embodiment, the determination process of determining the presence of a suitable delegate destination is executed by judging if the portable information terminal 100 is registered or not as a suitable delegate destination in the environmental setting of the browser of this portable telephone terminal 200.

Figure 12B:
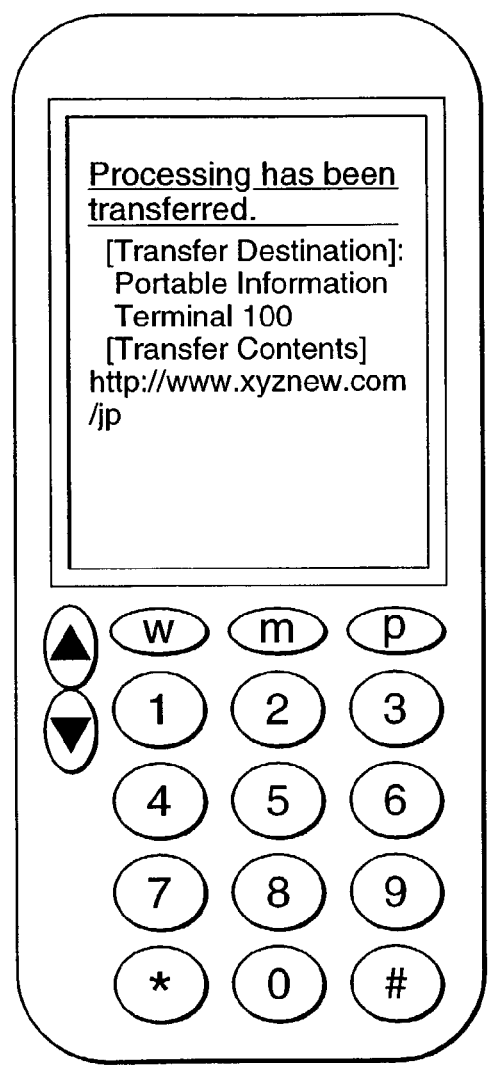

In step S5005, the data is delegated to a delegate destination (the portable information terminal 100 in the present embodiment), the process proceeds to step S5006 to display (see FIG. 12B), on the screen of the portable telephone terminal 200, a message indicating that the processing of the acquired data has been delegated to the portable information terminal 100, and then the process is terminated.

In the step S5007, the fact that no suitable delegate destination was found and processing failed is displayed on the screen of the portable telephone terminal 200, and the process is terminated.

In the present embodiment, as a situation where processing of the acquired data on the portable telephone terminal 200 is difficult to perform, it is given as an example that the portable telephone terminal 200 receives image data larger in size than the size of the display screen of the portable telephone terminal 200. However, the situation mentioned above is not limited to large sized image data. For example, the situation may include cases of receiving multimedia information requiring a large amount of calculations, data encoded with an encryption algorithm that is not installed, or data requiring a plugin (additional program module) that is not installed.

In addition, more simply, in the case of receiving data in a data format such as WML (Wireless Markup Language)/compact HTML or XHTML Basic other than data formats for portable telephones, all the processing may be delegated.

As another case, it is also possible to identify data to be delegated, according to its extension, for example, processing of data with an extension that is included in a prepared extension list (for example, a list given below) is delegated.

Figure 14:
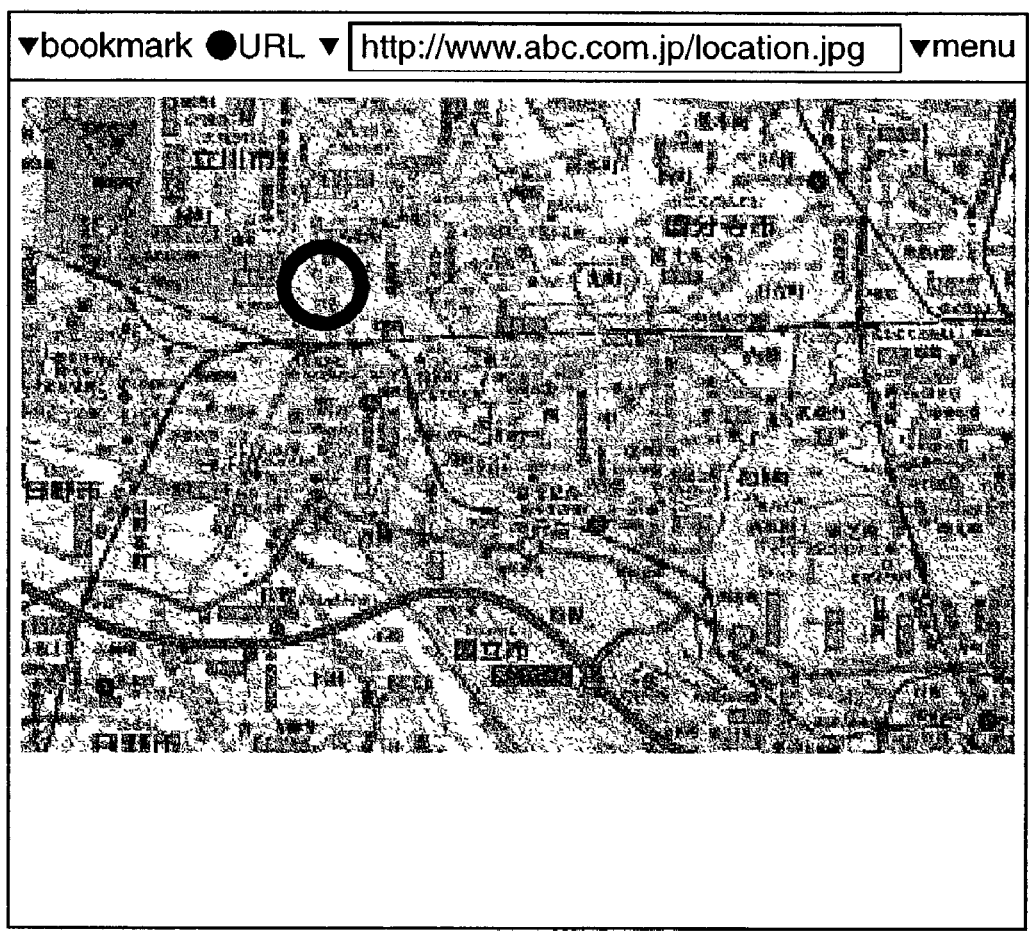
FIG. 14 shows an example of display, on the portable information terminal 100, of a part of a Web page of which display processing has been delegated from the portable telephone terminal 200.

[delegate list]={.jpg.gif.tiff.bmp};

Further, although in the present embodiment, the whole Web page difficult to process is delegated to the portable information terminal 100 to assign the processing thereto (see FIG. 13), only a part of the Web page (large image data in the present embodiment) difficult to process by the portable telephone terminal 200 may be delegated, and only the processing of the difficult part may be assigned thereto. This is effective in the case that the value of the information itself drops with a reduced size display as in the case of map information (see FIG. 14). In this case, only the rest (a part easy to be processed by the portable telephone terminal 200) may be displayed on the portable telephone terminal 200.

Yet further, although in the present embodiment, in the present embodiment, although the portable information terminal 100, to which the processing has been assigned, executes the processing immediately, it is also possible to temporarily the delegated information, and executes the processing actually upon an instruction being given later by the user.

Furthermore, although in the present embodiment, the portable telephone terminal 200 immediately delegates the information difficult to process by the portable telephone terminal 200, to the portable information terminal 100 and assigns the processing thereto, it is also possible to temporarily store the information, notify the user, through display, that the processing is difficult to perform, and delegate the information to the portable information terminal 100 to assign the processing thereto upon an instruction being given later by the user in response to the notification.

Still furthermore, although in the present embodiment, the portable telephone terminal 200, which has delegated data to the portable information terminal 100 that is the delegate destination, displays the fact on the screen of the portable telephone terminal 200 in step S5006, and immediately thereafter terminates the process, the portable telephone terminal 200 may be allowed to process the part, out of the data downloaded in step S5001, that is processable by the portable telephone terminal 200.

Although in the present embodiment, the program for performing determination as to the delegate on the portable telephone terminal 200 is previously stored in the memory section 220 of the portable telephone terminal 200, this program may be downloaded from the Web server 400 on the network N1. Further, the timing of downloading may be the time when an instruction is given by the user, or the time when the portable telephone terminal 200 detects the connection of the portable information terminal 100 with Bluetooth line network N3, etc. Still further, the program for performing determination as to the delegate may be provided by the portable information terminal 100 to the portable telephone terminal 200.

Furthermore, although in the present embodiment, the determination as to whether processing is difficult to perform or not is carried out during execution of the data acquiring process by the Web browser for portable telephone terminals, this determination process function may be provided on a different module from the Web browser for portable telephone terminals. For example, the process may be provided on a MIME (Multipurpose Internet Mail Extension) type processing module, or a data communication module of the portable telephone terminal 200.

Still furthermore, although in the present embodiment, the device that performs the determination as to the presence of a suitable delegate destination in step S5004 is the portable telephone terminal 200, this device is not limited to the portable telephone terminal 200, and may be applied to a different device that has the capability of output processing such as displaying the acquired information and can communicate with a plurality of devices. For example, a car navigation device having a browser with a communication capability may perform the determination processing described above.

Although in the above-described first embodiment, the communication between the portable information terminal 100 and the portable telephone terminal 200 is performed with a wireless communication system according to Bluetooth, the same communication may be performed with a wire communication system according to USB (Universal Serial Bus), UART (Universal Asynchronous Receiver/Transmitter), etc. instead of the wireless communication system according to Bluetooth. Wireless communication systems allow various communication styles, and on the other hand, wire communication systems allow stable communication.

Second Embodiment

In a second embodiment of the present invention as well, as in the first embodiment, when Web browsing is performed using the portable telephone terminal 200 provided with browser functions, such as an i-mode support portable telephone terminal, a high performance display is realized by the terminal 200 operating in cooperation with the portable information terminal 100, which cannot be achieved by the Web browsing of the portable telephone terminal 200 alone.

Furthermore, in the second embodiment, rules are provided so that the portable telephone terminal 200 delegates the processing of information included in a Web page to a different device or apparatus, wherein the portable telephone terminal 200 selects a device or apparatus from the portable information terminal 100, a note-type PC, an MP3 player, etc., depending on the type and contents of the Web page, in order to delegate the processing of the information on the type and contents.

First, the arrangement of a communication system for the portable telephone terminal 200 and the portable information terminal 100 according to the second embodiment will be described.

Figure 15:
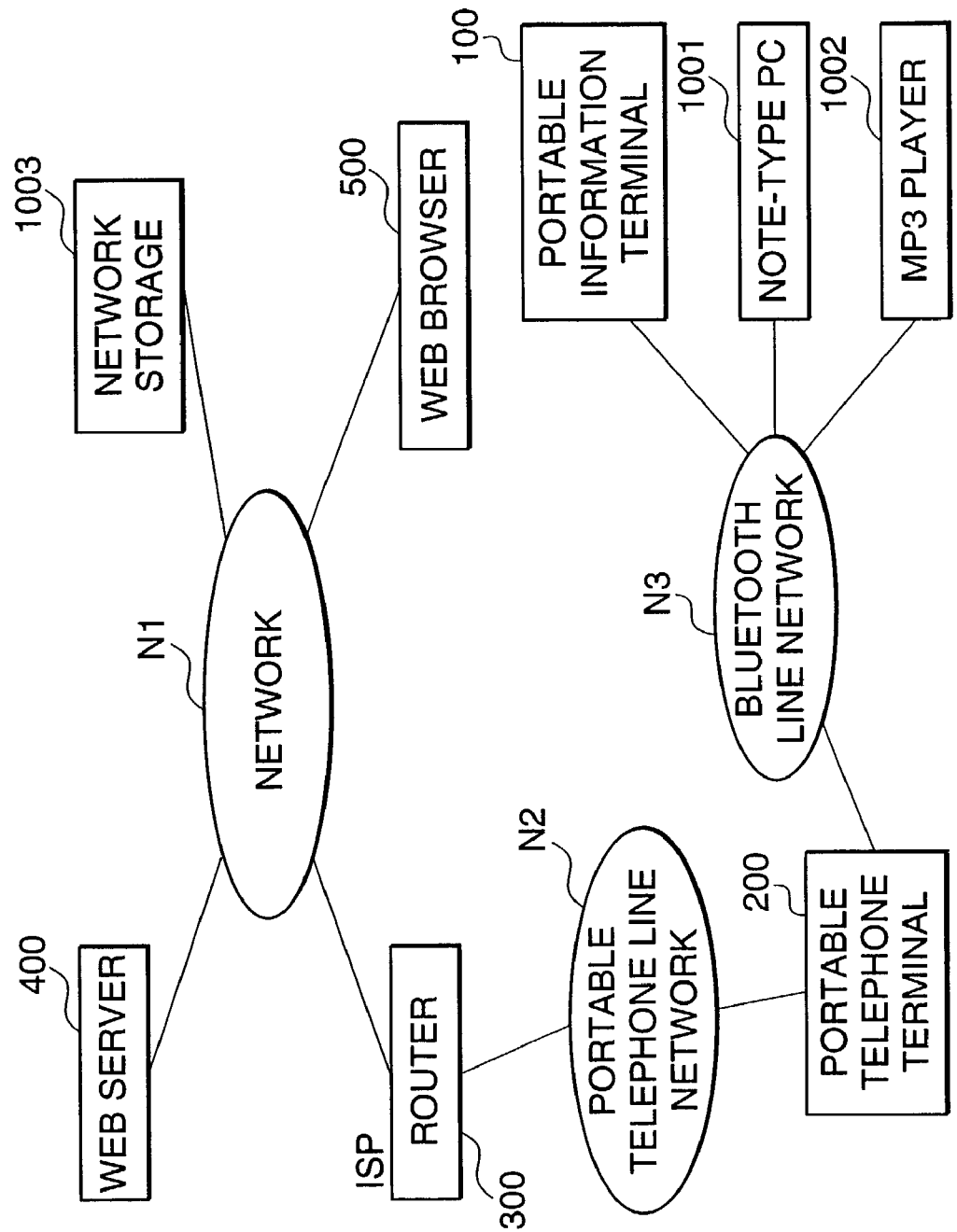
FIG. 15 is a diagram showing the arrangement of a communication system according to a second embodiment of the present invention.

FIG. 15 is a diagram showing the arrangement of the communication system according to the second embodiment of the present invention. The communication system according to the second embodiment is different from the communication system according to the first embodiment shown in FIG. 5 in the following points:

(1) Further connected to the Bluetooth line network N3 are a note-type PC 1001 and a MP3 player 1002, as well as the portable information terminal 100 and the portable telephone terminal 200, wherein all of these can directly communicate with each other.

(2) Further connected to the network N1 is a network storage 1003 that is a network connectable storage device, as well as a Web server 400 and a Web browser 500, wherein the network storage 1003, as well as the Web server 400, can communicate with the portable telephone terminal 200, the portable information terminal 100, etc. via a router 300.

The note-type PC 1001, the MP3 player 1002, and the network storage 1003, which are to be designated as delegate destinations, are provided with a waiting server function similar to the waiting server function of the portable information terminal 100, which was described with reference to FIG. 8.

Next, the portable telephone terminal 200 according to the second embodiment will be described.

The portable telephone terminal 200 according to the second embodiment performs the determination as to the presence of a suitable delegate destination as in the first embodiment, but the method of the determination is different. Specifically, in the second embodiment, according to previously set rules, it is determined whether to delegate processing or not, and a delegate destination is decided.

Figures 18, 19:
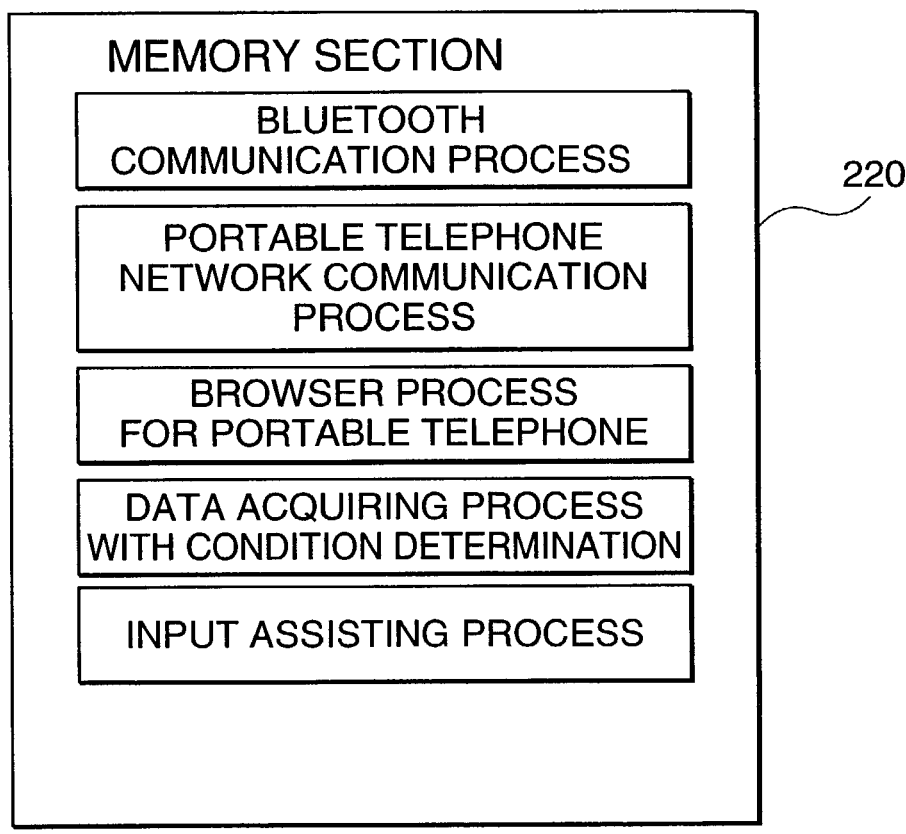
FIG. 18 is a diagram showing the software configuration of the portable telephone terminal 200 according to the fourth embodiment.
FIG. 19 is a diagram showing a delegate setting table indicating delegate determination rules using extensions, which are used by the second embodiment.

According to the rules, in the second embodiment, the determination as to whether the processing is to be delegated is made and a delegate destination is decided, based on an extension of the information. FIG. 19 illustrates a delegate setting table indicating the delegate determination rules using extensions. This delegate setting table is stored in the memory section 220 of the portable telephone terminal 200.

In the delegate setting table shown in FIG. 19, extensions are recorded in the left column, and information designating delegate destinations is recorded in the right column, respectively. As information designating a delegate destination, BD_ADDR (Bluetooth Device Address; 48 bit), which is the address information for identification of a device based on Bluetooth specification, and a port number, which is the information for selection of a service in the device, are recorded next to each other.

Figure 16:
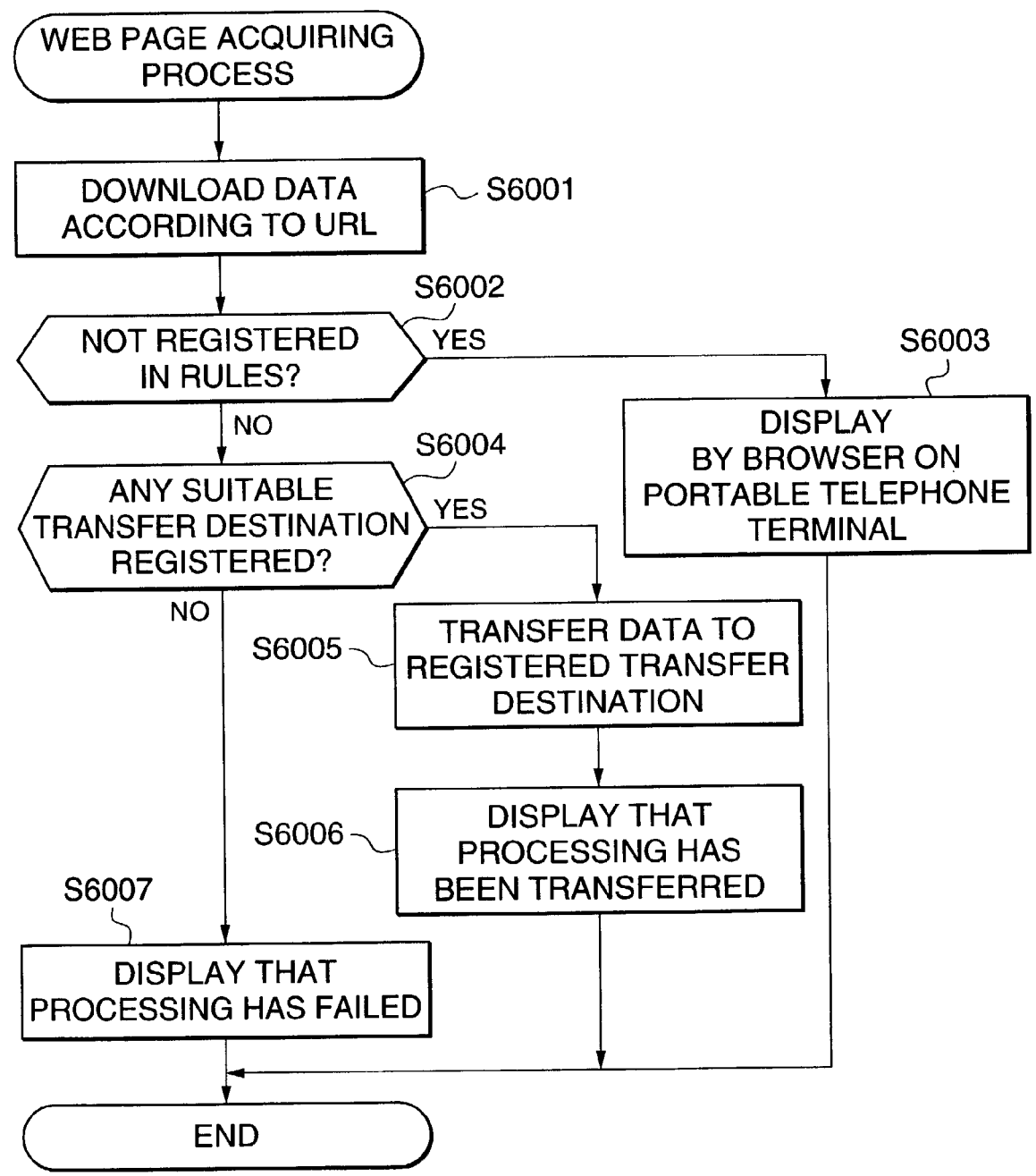
FIG. 16 is a flowchart showing a Web page acquiring process (delegate process) performed by the portable telephone terminal 200 according to the second embodiment.

FIG. 16 is a flowchart of the acquiring process of a Web page (delegate process) performed by the portable telephone terminal 200 according to the second embodiment of the present invention. A program describing the processing is stored in the memory section 220 of the portable telephone terminal 200 and called as part of the Web browser functions, to perform a delegate determination process specific to the second embodiment.

First, data is downloaded in step S6001, according to a designated URL. In step S6002, it is determined whether an extension of the acquired data is registered in the delegate setting table to indicate that the data is to be delegated. If the extension is not registered, then the data is judged to be processable by the portable telephone terminal 200 and the process proceeds to step S6003 to analyze and display the acquired data with the Web browser of the portable telephone terminal 200, and the process is terminated.

On the other hand, if the extension is registered, then it is determined whether a suitable delegate destination is registered in the delegate setting table or not, that corresponds to the extension (step S6004). If a suitable delegate destination is registered, then the process proceeds to step S6005, or otherwise the process proceeds to step S6007.

In step S6005, the data is delegated to the registered delegate destination. The process then proceeds to step S6006 to display on the screen of the portable telephone terminal 200 a message to the effect that the processing of the acquired data has been delegated to the registered delegate destination, and the process is terminated.

In the step S6007, a message is displayed on the screen of the portable telephone terminal 200 to the effect that the delegate processing failed because no suitable delegate destination is registered, and then the process is terminated.

As described above, according to the second embodiment, a delegate destination is determined according to the type of information, particularly to an extension of its URL, the delegate destination may be determined according to the type of MIME acquired from the header information of HTTP. In addition, irrespective of the URL and the type of MIME, the delegate destination may be determined according to information obtained by analysis of the contents of the acquired data. As in the first embodiment, it goes without saying that parameters such as image size can be used as parameters for delegate determination. Still further, in addition to delegating acquired data per se, additional information such as processing parameters to be used at the delegate destination may be attached to the acquired data and delegated together therewith.

Furthermore, although in the second embodiment, it was merely described for the simplicity of description that data satisfying the delegate conditions is automatically delegated to the delegate destination upon a determination to delegate the data being made, it is also possible to inquire the user whether to delegate or not, prior to the actual delegate, and then perform the delegate processing according to a response by the user to the inquiry.

Still furthermore, although in the second embodiment, the combined information of BD_ADDR defined for a Bluetooth device and a port number that is an identification number of a service in the device is used as the information for designating the delegate destination, the method of designating the delegate destination is not limited to this. For example, the combined information of IP address, FQDN (Fully Qualified Domain Name), or the like, which is positioned in an upper layer of the network N1, may be used as the information for designating the delegate destination.

In other words, not only close or neighboring devices connected to the Bluetooth line network N3, but also various devices connected to the Internet may be delegate destinations. For example, the network storage 1003, connected to the network N1 and accessible via the router 300 as well as the Web server 400 can be designated as delegate designations.

Yet furthermore, although in the second embodiment, data processing is exclusively delegated to a single delegate destination, data processing may be overlappingly delegated to a plurality of delegate destinations, depending on the attributes of data. For example, delegating new schedule data of a scheduler or the like to the note-type PC 1001 in addition to the portable information terminal 100 enables synchronizing schedulers of a plurality of devices.

Third Embodiment

Also in a third embodiment of the present invention, as in the first and second embodiments, when Web browsing is performed using the portable telephone terminal 200, such as an i-mode support portable telephone terminal, equipped with browser functions, a high performance display is realized by the portable telephone terminal 200 operating in cooperation with the portable information terminal 100, which cannot be achieved by the Web browsing of the portable telephone terminal 200 alone.

Furthermore, in the third embodiment, the setting contents of the rules for delegating the data processing as in the second embodiment can be dynamically changed, to thereby realize proper delegate processing depending on the situations.

Specifically, the contents of the delegate setting table, shown in FIG. 19, are updated in linkage with the service discovery function of Bluetooth communication. In other words, when a device providing a suitable service to the acquired data is newly found among the devices connected to the Bluetooth line network N3 in the vicinity of the portable telephone terminal 200, the newly found device is additionally registered into the delegate setting table as a delegate destination, and on the other hand, when no suitable device is found, the network storage 1003 or the like is registered into the delegate setting table so that the data is temporarily stored in the network storage 1003 or the like.

When the connection of any of the devices registered as delegate destinations to the Bluetooth line network N3 has been disconnected, the registration of the device is canceled. The portable telephone terminal 200 may periodically perform such updating processing of the delegate setting table.

Although in the third embodiment, data processing is delegated merely to devices that provide services in the vicinity of the portable telephone terminal 200, it is possible to register devices into the delegate setting table by performing user authentication or the like such that data processing is delegated only to limited delegate destinations. Conversely, it is also possible to arrange such that data processing is delegated to all the devices that provide services in the vicinity of the portable telephone terminal 200.

In addition, in the third embodiment, the portable telephone terminal 200 manages the delegate setting table by determining whether devices connected to Bluetooth provide a suitable service to the acquired data. However, to assist the management, it may be arranged such that the respective devices connected to Bluetooth themselves request the portable telephone terminal 200 to register the attributes and the like of data that they can receive.

Fourth Embodiment

Also in a fourth embodiment of the present invention, as in the first to third embodiments, when Web browsing is performed using the portable telephone terminal 200, such as an i-mode support portable telephone terminal, equipped with browser functions, a high performance display is realized by the portable telephone terminal 200 operating in cooperation with the portable information terminal 100, which cannot be achieved by the Web browsing of the portable telephone terminal 200 alone.

Further, in the fourth embodiment, the portable telephone terminal 200 does not only delegate data processing, but also indirectly inputs operation information related to the delegate destination to which the data processing has been delegated, from the portable telephone terminal 200.

First, the portable information terminal 100 according to the fourth embodiment will be described. The portable information terminal 100 according to the fourth embodiment has the same functions as those in the first embodiment, and besides, a remote input function of handling input information transmitted by the portable telephone terminal 200 is additionally provided.

The portable information terminal 100 according to the fourth embodiment uses a remote input conversion table shown in FIG. 20 in executing this remote input process. This remote input conversion table is formed of a correspondence between input key information to be transmitted by the portable telephone terminal 200 and the contents of processing to be executes upon receipt of the input key information.

This remote input conversion table is previously stored in the ROM 123 of the portable information terminal 100.

Figure 17:
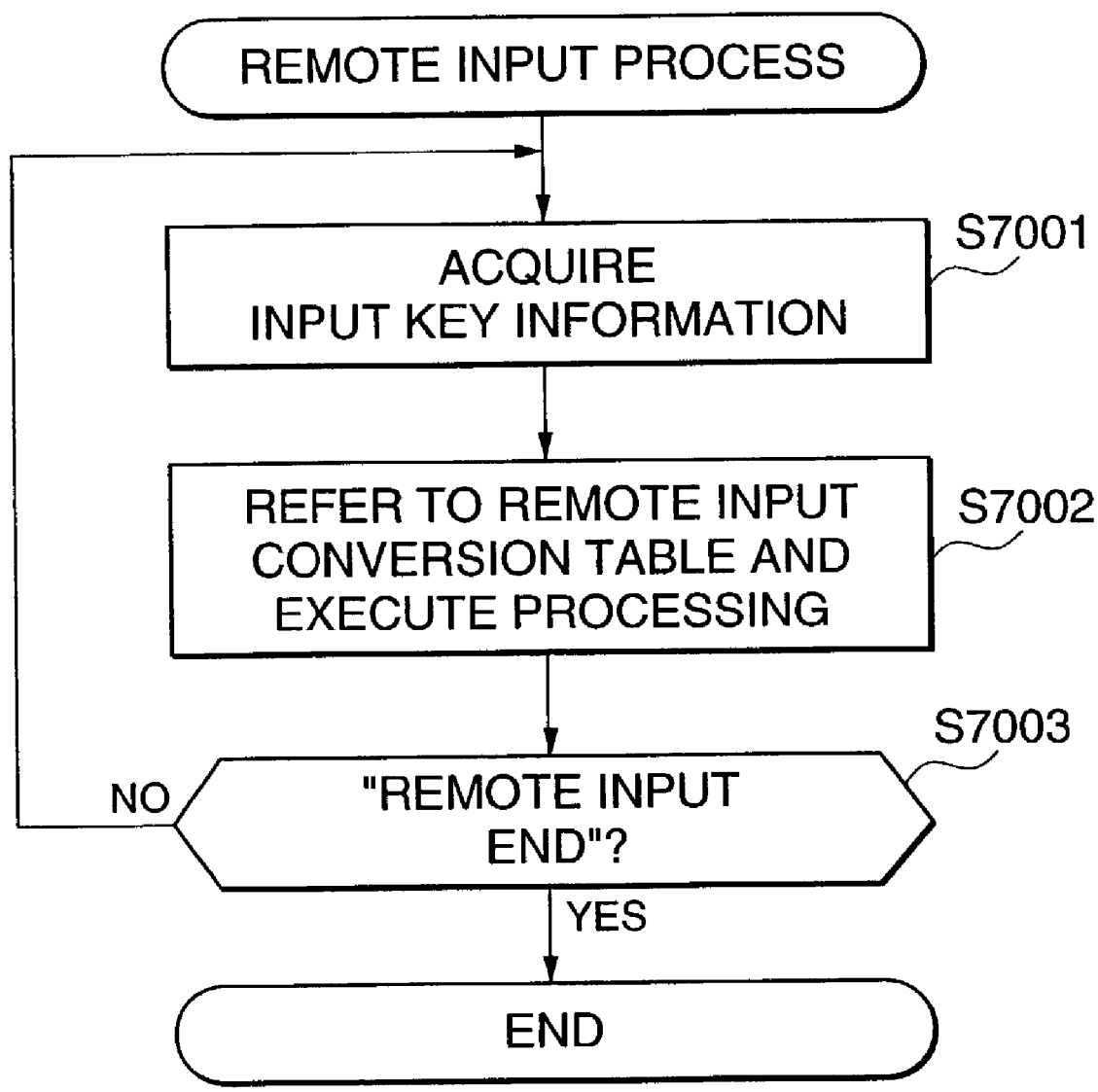
FIG. 17 is a flowchart showing a remote input process performed by a portable information terminal 100 according to a fourth embodiment of the present invention.

FIG. 17 is a flowchart of the remote input process performed by the portable information terminal 100 according to the fourth embodiment. A program describing the remote input process is previously stored in the ROM 123 of the portable information terminal 100, and executes the remote input process specific to the fourth embodiment after the waiting server process is completed.

First, in step S7001, input key information transmitted by the portable telephone terminal 200 is received. Next, in step S7002, referring to the remote input conversion table described above, processing corresponding to the received input key information is identified and executed.

Next, in step S7003, it is determined whether the identified processing corresponding to the input key information received in step S7002 is "End Remote Input" or not. If the identified processing is "End Remote Input", then the remote input process is terminated, and if the identified processing is not "End Remote Input", then the process proceeds back to step S7001, and the next input key information is received.

Next, the portable telephone terminal 200 according to the fourth embodiment will be described.

The portable telephone terminal 200 according to the fourth embodiment has the same functions as those in the first embodiment, and further, a function of performing an input assisting process is additionally provided. A program describing the input assisting process is shown in FIG. 18 and previously stored in the memory section 220 of the portable telephone terminal 200. After a predetermined key operation is carried out or after the data acquired from the Web server 400 is delegated to the designated delegate destination (step S5005 in FIG. 10), the program is started to execute an indirect input process specific to the fourth embodiment to delegate input key information to the delegate destination.

After execution of a predetermined key operation or delegate of data to the delegate designation, this input assisting process is automatically started, whereby input key information continues to be delegated to the portable information terminal 100 that is the delegate destination until a specific key (key "0" in the present embodiment) is operated.

The remote input conversion table used in the fourth embodiment is adapted to receive simple input key information and map proper processing contents in correspondence to the input key information. The information transmitted from the portable telephone terminal 200 may include various parameter information other than the input key information. For example, input information containing text information for input to a text input box may be delegated from the portable telephone terminal 200. Further, a protocol for delivering more complex information may be implemented.

Furthermore, although in the fourth embodiment, the remote input process is performed on the portable information terminal 100 by the portable telephone terminal 200, if the data processing is delegated to the note-type PC 1001, the MP3 player 1002, or the network storage 1003, the remote input process may be performed on these devices.

It is to be understood that the object of the present invention may also be accomplished by supplying a system or an apparatus such as a portable information terminal and a portable telephone terminal, with a medium in which a program code of software which realizes the functions of any of the above described embodiments is stored, and causing a computer (or CPU or MPU) of the system or apparatus to read out and execute the program code stored in the medium.

In this case, the program code itself read from the medium realizes the functions of the embodiment, and hence the medium on which the program code is stored constitutes the present invention.

Examples of the medium for supplying the program code include a flexible disk, a hard disk, an optical disk, an optical magnetic disk, a CD-ROM, a CD-R, a CD-RW, DVD-ROM, a DVD-RAM, a DVD-RW, a DVD-RW, a magnetic tape, a non-volatile memory card, a ROM, and a server computer connected to a network for communication therewith.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

As described above in details, according to the first through fourth embodiments, the portable telephone terminal 200 is provided with the function of delegating data processing, the portable information terminal 100 is provided with the waiting server function, and the portable telephone terminal 200 and the portable information terminal 100 cooperate to process data, out of data acquired from the Web server 400 by the portable telephone terminal 200, that is difficult to process by the portable telephone terminal 200, whereby a high performance processing function can be realized.

What is claimed is:

1. A communication apparatus comprising:
    an acquiring device that acquires information from an external apparatus by communication;
    a determination device that automatically determines whether the information acquired by said acquiring device is suitable for processing by the communication apparatus according to the information acquired by said acquiring device; and
    a delegation device that automatically delegates, without a user input, processing of information determined by said determination device to be unsuitable for processing by the communication apparatus to an information apparatus.

2. A communication apparatus according to claim 1, which comprises a portable telephone terminal.

3. A communication apparatus according to claim 1, wherein said acquiring device acquires information managed by a server on a network.

4. A communication apparatus according to claim 1, wherein said determination device determines whether the information acquired by said acquiring device is suitable for processing by the communication apparatus by comparing a size of display required by the information with a size of a display screen of the communication apparatus.

5. A communication apparatus according to claim 1, wherein said determination device determines the information acquired by said acquiring device to be unsuitable for processing by the communication apparatus, if a processing amount of the information is greater than a predetermined amount.

6. A communication apparatus according to claim 1, wherein said determination device determines the information acquired by said acquiring device to be unsuitable for processing by the communication apparatus, if the information is encrypted with an encryption system that is not provided on the communication apparatus.

7. A communication apparatus according to claim 1, wherein said determination device determines the information acquired by said acquiring device to be unsuitable for processing by the communication apparatus, if the information is to be processed with plug-in software that is not provided on the communication apparatus.

8. A communication apparatus according to claim 1, wherein said determination device determines whether the information acquired by said acquiring device is suitable for processing by the communication apparatus, according to at least one of a data format and an extension of the information.

9. A communication apparatus according to claim 1, wherein said determination device determines whether the information acquired by said acquiring device is suitable for processing by the communication apparatus, according to a result of analysis of contents of the information.

10. A communication apparatus according to claim 1, wherein said delegation device delegates processing of a part of the information acquired by said acquiring device to the information apparatus, if the part of the information is determined by said determination device to be unsuitable for processing by the communication apparatus.

11. A communication apparatus according to claim 1, wherein said delegation device is responsive to a result of the determination by said determination device that the information acquired by said acquiring device is unsuitable for processing by the communication apparatus, for storing the information and displaying the result of the determination, and for delegating processing of the information to the information apparatus after an instruction to delegate the processing is given.

12. A communication apparatus according to claim 1, wherein said delegation device delegates at least one parameter for processing the information acquired by said acquiring device together with the information to the information apparatus to delegate processing of the information.

13. A communication apparatus according to claim 1, wherein said delegation device includes a designation device that designates the information apparatus as a delegate destination.

14. A communication apparatus according to claim 13, wherein said designation device designates the information apparatus as a delegate destination according to determination conditions applied for the determination by said determination device.

15. A communication apparatus according to claim 13, wherein said designation device carries out the designation using a table in which candidates for the information apparatus as a delegate destination is registered in correspondence to determination conditions to be applied for the determination by said determination device.

16. A communication apparatus according to claim 15, wherein said designation device includes an updating device that updates contents of registration of the table.

17. A communication apparatus according to claim 1, wherein the communication apparatus comprises an instruction device that instructs the information apparatus to process the information after said delegation device delegates processing of the information to the information apparatus.

18. A communication apparatus according to claim 1, wherein at least one of said determination device and said delegation device is implemented by a program acquired by communication.

19. A communication apparatus according to claim 1, wherein the communication apparatus comprises an acception device that accepts a request for registration as a delegate destination made from the information apparatus together with indication of at least attributes of information that can be processed by the information apparatus.

20. A method of controlling a communication apparatus, comprising:
    an acquiring step of acquiring information from an external apparatus by communication;
    a determination step of automatically determining whether the information acquired by said acquiring step is suitable for processing by the communication apparatus according to the information acquired in said acquiring step; and
    a delegating step of automatically delegating, without a user input, processing of information determined by said determination step to be unsuitable for processing by the communication apparatus to an information apparatus.

21. A method of controlling a communication system including a communication apparatus connectable to a wide area network, and an information apparatus connected to said communication apparatus for communication therewith, the method comprising:

a first acquiring step of acquiring information from the wide area network by communication;

a determination step of automatically determining whether the information acquired by said first acquiring step is suitable for processing by the communication apparatus according to the information acquired in said first acquiring step;

a delegating step of automatically delegating, without a user input, processing of information determined by said determination step to be unsuitable for processing by the communication apparatus to the information apparatus;

a second acquiring step of waiting for information to be automatically delegated to the information apparatus and acquiring the information; and an executing step of executing processing of the information delegated to the information apparatus and acquired in said second acquiring step.

22. A communication system comprising a communication apparatus connectable to a wide area network, and an information apparatus connected to said communication apparatus for communication therewith, wherein:

said communication apparatus includes: a first acquiring device that acquires information from the wide area network by communication, a determination device that automatically determines whether the information acquired by said first acquiring device is suitable for processing by said communication apparatus according to the information acquired by said acquiring device, and a delegation device that is responsive to a result of the determination by said determination device that the acquired information is not suitable for processing by said communication apparatus, for automatically delegating, without a user input, processing of the information to said information apparatus; and said information apparatus includes: a second acquiring device that waits for the information having processing thereof delegated by said delegation device to be delegated to said information device, and an execution device that executes the delegated processing on the information acquired by said second acquiring device.

23. A control program for causing a computer to control a communication apparatus, the program comprising:

an acquiring module for acquiring information from outside by communication;

a determination module for automatically determining whether the information acquired by said acquiring module is suitable for processing by the communication apparatus according to the information acquired by said acquiring module; and a delegate module for automatically delegating, without a user input, processing of information determined by said determination module to be unsuitable for processing by the communication apparatus to an information apparatus.

24. A control program for causing a computer to control a communication system including a communication apparatus connectable to a wide area network, and an information apparatus connected to the communication apparatus for communication therewith, the control program comprising:

a first acquiring module for acquiring information from the wide area network by communication;

a determination module for automatically determining whether the information acquired by said first acquiring module is suitable for processing by the communication apparatus according to the information acquired by said first acquiring module;

a delegate module for automatically delegating, without a user input, processing of information determined by said determination module to be unsuitable for processing by the communication apparatus to the information apparatus;

a second acquiring module for waiting for information to be automatically delegated to the information apparatus and acquiring the information; and an executing module for executing processing of the information delegated to the information apparatus and acquired by said second acquiring module.

25. A medium that computer-readably contains a control program according claim 23.

26. A medium that computer-readably contains a control program according to claim 24.

27. A communication apparatus according to claim 19, wherein said determination device determines a delegate destination according to the information acquired by said acquiring device and the request for registration as a delegate destination accepted by said accepting device.

28. A communication apparatus according to claim 27, further comprising:

a storage, wherein said determination device determines said storage as a delegate destination, when said determination device is not capable of determining a delegate destination from the request accepted by said acception device.

29. A communication apparatus according to claim 19, further comprising:

a memory that stores a plurality of key information indicating contents of processing, wherein said delegation device delegates processing of the information, and transmits a key information of the plurality of key information corresponding to a content of the processing of the information to a delegate destination.

* * * * *